United States Patent
Taherzadeh Boroujeni et al.

(10) Patent No.: US 11,570,809 B2
(45) Date of Patent: Jan. 31, 2023

(54) COMPACT DOWNLINK CONTROL INFORMATION FOR A TWO-STEP RANDOM ACCESS CHANNEL PROCEDURE

(71) Applicant: QUALCOMM Incorporated, San Diego, CA (US)

(72) Inventors: Mahmoud Taherzadeh Boroujeni, San Diego, CA (US); Tao Luo, San Diego, CA (US); Juan Montojo, San Diego, CA (US); Jelena Damnjanovic, Del Mar, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/171,409

(22) Filed: Feb. 9, 2021

(65) Prior Publication Data
US 2021/0282178 A1    Sep. 9, 2021

Related U.S. Application Data

(60) Provisional application No. 62/986,518, filed on Mar. 6, 2020, provisional application No. 62/986,475, filed on Mar. 6, 2020.

(51) Int. Cl.
*H04W 74/00* (2009.01)
*H04W 72/04* (2009.01)
(Continued)

(52) U.S. Cl.
CPC ....... *H04W 74/006* (2013.01); *H04W 72/042* (2013.01); *H04W 74/0833* (2013.01); *H04L 1/0061* (2013.01)

(58) Field of Classification Search
None
See application file for complete search history.

(56) References Cited

U.S. PATENT DOCUMENTS 10,939,382 B2 *   3/2021   Zhou ............... H04W 52/44
11,159,959 B2 *  10/2021   Zhou ............... H04B 7/0626
(Continued)

FOREIGN PATENT DOCUMENTS

WO    WO-2014181156 A1      11/2014
WO    WO-2016053026 A1 *     4/2016   ......... H04L 1/0072

OTHER PUBLICATIONS

"3rd Generation Partnership Project, Technical Specification Group Radio Access Network, Evolved Universal Terrestrial Radio Access (E-UTRA), Medium Access Control (MAC) protocol specification (Release 12)", 3GPP Standard 3GPP TS 36.321, 3rd Generation Partnership Project (3GPP), Mobile Competence Centre, 650, Route Des Lucioles, F-06921 Sophia-Antipolis Cedex, France, vol. RAN WG2, No. V12.2.0, Jul. 1, 2014 (Jul. 1, 2014), pp. 1-57, XP050774519, [retrieved on Jul. 1, 2014] paragraph 5.1.

(Continued)

*Primary Examiner* — Faiyazkhan Ghafoerkhan
(74) *Attorney, Agent, or Firm* — Holland & Hart LLP

(57) ABSTRACT

Methods, systems, and devices for wireless communications are described. A user equipment (UE) may transmit, to a base station, a first message of a two-step random access procedure. An attribute or content of the first message may indicate a request for a second type of control signaling that including fewer bits than a first type of control signaling. The UE may receive a second message of the two-step random access procedure including the second type of control signaling based on the first message. The UE may communicate with the base station on resources scheduled by the second message on a downlink shared channel.

30 Claims, 19 Drawing Sheets

(51) Int. Cl.
   *H04W 74/08*   (2009.01)
   *H04L 1/00*    (2006.01)

(56) References Cited

U.S. PATENT DOCUMENTS

| | | | | |
|---|---|---|---|---|
| 2016/0366704 | A1* | 12/2016 | Lee | H04W 72/0413 |
| 2017/0013610 | A1* | 1/2017 | Lee | H04L 1/00 |
| 2017/0019930 | A1* | 1/2017 | Lee | H04W 72/1284 |
| 2018/0014301 | A1* | 1/2018 | Chen | H04L 1/1896 |
| 2018/0110074 | A1* | 4/2018 | Akkarakaran | H04W 74/0833 |
| 2019/0132109 | A1* | 5/2019 | Zhou | H04L 5/001 |
| 2019/0141546 | A1* | 5/2019 | Zhou | H04W 72/1294 |
| 2019/0191434 | A1* | 6/2019 | Hugl | H04L 5/0096 |
| 2019/0246398 | A1* | 8/2019 | Chen | H04L 5/0094 |
| 2019/0253986 | A1* | 8/2019 | Jeon | H04W 72/042 |
| 2019/0306801 | A1* | 10/2019 | Zhou | H04W 52/44 |
| 2020/0007201 | A1* | 1/2020 | Liu | H04W 72/042 |
| 2020/0146035 | A1* | 5/2020 | Kim | H04L 5/0094 |
| 2020/0266867 | A1* | 8/2020 | Park | H04W 52/146 |
| 2020/0313827 | A1* | 10/2020 | Noh | H04B 7/0695 |
| 2021/0099254 | A1* | 4/2021 | Babaei | H04L 1/1896 |
| 2021/0105851 | A1* | 4/2021 | Kim | H04L 1/1861 |
| 2021/0144743 | A1* | 5/2021 | Rastegardoost | H04W 72/1257 |
| 2021/0167914 | A1* | 6/2021 | Kwak | H04L 5/0048 |
| 2021/0282178 | A1* | 9/2021 | Taherzadeh Boroujeni | H04W 74/0833 |
| 2021/0314084 | A1* | 10/2021 | Hwang | H04L 1/1854 |

OTHER PUBLICATIONS

"3rd Generation Partnership Project, Technical Specification Group Radio Access Network, Study on New Radio Access Technology, Radio Interface Protocol Aspects (Release 14)", 3GPP Draft, 38804-100, 3rd Generation Partnership Project (3GPP), Mobile Competence Centre, 650, Route Des Lucioles, F-06921 Sophia-Antipolis Cedex, France, Mar. 18, 2018 (Mar. 18, 2018), XP051507149, Retrieved from the Internet: URL: http://www.3gpp.org/ftp/tsg%5Fran/TSG%5FRAN/TSGR%5F75/Docs/RP%2D170477%2Ezip. [retrieved on Mar. 18, 2018] Annex E.1.

International Search Report and Written Opinion—PCT/US2021/017433—ISA/EPO—dated Jun. 7, 2021.

* cited by examiner

COMPACT DOWNLINK CONTROL INFORMATION FOR A TWO-STEP RANDOM ACCESS CHANNEL PROCEDURE

CROSS REFERENCE

The present Application for Patent claims the benefit of U.S. Provisional Patent Application No. 62/986,518 by TAHERZADEH BOROUJENI et al., entitled "COMPACT DOWNLINK CONTROL INFORMATION FOR A TWO-STEP RANDOM ACCESS PROCEDURE," filed Mar. 6, 2020, and U.S. Provisional Patent Application No. 62/986,475 by TAHERZADEH BOROUJENI et al., entitled "COMPACT DOWNLINK CONTROL INFORMATION FOR A FOUR-STEP RANDOM ACCESS PROCEDURE," filed Mar. 6, 2020, assigned to the assignee hereof, and expressly incorporated by reference herein.

FIELD OF TECHNOLOGY

The following relates generally to wireless communications and more specifically to compact downlink control information for a two-step random access channel procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may perform a random access procedure to establish a connection with a base station. In some cases, the coverage of a message of the random access procedure may be limited.

SUMMARY

Some of the described techniques relate to improved methods, systems, devices, and apparatuses that support compact control signaling (e.g., downlink control information (DCI)) for a two-step random access procedure. Generally, the described techniques provide for using a compact DCI to improve coverage of a second random access message, Message B, of the two-step random access procedure Some of the described techniques relate to improved methods, systems, devices, and apparatuses that support compact control signaling (e.g., DCI) for a four-step random access procedure. Generally, the described techniques provide for using a compact DCI to improve coverage of a second random access message of the four-step random access procedure.

Wireless communications systems described herein may support two-step random access procedures that use a compact DCI for scheduling the second random access message of the two-step random access procedure. For example, a base station may transmit a compact DCI to a UE to schedule the second random access message. The compact DCI may be an example of a type of control signaling that includes fewer information bits than a second type of control signaling (e.g., a second type of DCI). For example, a payload of the compact DCI may include fewer information bits or a fewer cyclic redundancy check (CRC) bits. A wireless communications system may support both the compact DCI and the second DCI that includes more bits than the compact DCI. A UE may send the first random access message with an attribute or content that indicates a request for the compact DCI. The base station may receive the first random access message, detect the attribute, and send the compact DCI to schedule the second random access message. In some cases, the UE may be configured with a set of conditions for requesting the compact DCI. In some cases, configuration information for the attributes or conditions may be sent to UEs via system information signaling (e.g., a system information block (SIB)) including remaining minimum system information or other system information.

In some cases, the wireless communications systems described herein may support four-step random access procedures that use a compact DCI for scheduling a second random access message of the four-step random access procedure. For example, a base station may transmit a compact DCI to a UE to schedule the second random access message. The compact DCI may be an example of a type of control signaling that includes fewer information bits than a second type of control signaling (e.g., a second type of DCI). For example, a payload of the compact DCI may include fewer information bits or a fewer CRC bits. A wireless communications system may support both the compact DCI and second type of DCI that includes more bits than the compact DCI. A UE may send the first random access message with an attribute that indicates a request for the compact DCI. The base station may receive the first random access message, detect the attribute, and send the compact DCI to schedule the second random access message. In some cases, the UE may be configured with a set of conditions for requesting the compact DCI. In some cases, configuration information for the attributes or conditions may be sent to UEs via system information signaling (e.g., a SIB) including remaining minimum system information or other system information.

A method of wireless communications at a UE is described. The method may include transmitting, to a base station, a first message of a two-step random access procedure, where an attribute or a content of the first message indicates a request for a second type of control signaling that includes fewer bits than a first type of control signaling, receiving a second message of the two-step random access procedure including the second type of control signaling based on the first message, and communicating with the base station on resources based on the second message.

An apparatus for wireless communications at a UE is described. The apparatus may include a processor, memory coupled with the processor, and instructions stored in the memory. The instructions may be executable by the processor to cause the apparatus to transmit, to a base station, a first message of a two-step random access procedure, where an attribute or a content of the first message indicates a request for a second type of control signaling that includes fewer bits than a first type of control signaling, receive a second message of the two-step random access procedure including the second type of control signaling based on the first message, and communicate with the base station on resources based on the second message.

Another apparatus for wireless communications at a UE is described. The apparatus may include means for transmitting, to a base station, a first message of a two-step random access procedure, where an attribute or a content of the first message indicates a request for a second type of control signaling that includes fewer bits than a first type of control signaling, receiving a second message of the two-step random access procedure including the second type of control signaling based on the first message, and communicating with the base station on resources based on the second message.

A non-transitory computer-readable medium storing code for wireless communications at a UE is described. The code may include instructions executable by a processor to transmit, to a base station, a first message of a two-step random access procedure, where an attribute or a content of the first message indicates a request for a second type of control signaling that includes fewer bits than a first type of control signaling, receive a second message of the two-step random access procedure including the second type of control signaling based on the first message, and communicate with the base station on resources based on the second message.

In some examples of the method, apparatuses, and non-transitory computer-readable medium described herein, the content of the first random access message includes an explicit request for the second type of control signaling.

Some examples of the method, apparatuses, and non-transitory computer-readable medium described herein may further include operations, features, means, or instructions for receiving configuration information from the base station indicating a set of conditions for transmitting the first message with the attribute or the content to request the second type of control signaling.

In some examples of the method, apparatuses, and non-transitory computer-readable medium described herein, the set of conditions includes an indication to improve coverage of the second message, a threshold for a reference signal received power from the base station, a maximum power exposure threshold, or a combination thereof.

In some examples of the method, apparatuses, and non-transitory computer-readable medium described herein, the configuration information includes a set of attributes including a type of first message, a set of random access preamble sequences, a set of time resources, a set of random access occasions, or a combination thereof, where the attribute indicating the request for the second type of control signaling includes one or more attributes from the set of attributes.

In some examples of the method, apparatuses, and non-transitory computer-readable medium described herein, the configuration information may be received in a system information block including remaining minimum system information or other system information.

Some examples of the method, apparatuses, and non-transitory computer-readable medium described herein may further include operations, features, means, or instructions for determining to transmit the first message of the two-step random access procedure with the attribute or the content indicating the request for the second type of control signaling based on satisfying one or more conditions of the set of conditions.

In some examples of the method, apparatuses, and non-transitory computer-readable medium described herein, the configuration information includes an identifier for a group of UEs including the UE or a UE-specific identifier for the UE.

In some examples of the method, apparatuses, and non-transitory computer-readable medium described herein, the second type of control signaling includes DCI having fewer information bits, fewer cyclic redundancy check bits, or both, than the first type of control signaling.

A method of wireless communications at a base station is described. The method may include receiving, from a UE, a first message of a two-step random access procedure, where an attribute or a content of the first message indicates a request for a second type of control signaling that includes fewer bits than a first type of control signaling, transmitting a second message of the two-step random access procedure including the second type of control signaling based on the first message, where the second type of control signaling schedules the UE with resources for a downlink shared channel, and communicating with the UE on the resources that are scheduled by the second message on the downlink shared channel.

An apparatus for wireless communications at a base station is described. The apparatus may include a processor, memory coupled with the processor, and instructions stored in the memory. The instructions may be executable by the processor to cause the apparatus to receive, from a UE, a first message of a two-step random access procedure, where an attribute or a content of the first message indicates a request for a second type of control signaling that includes fewer bits than a first type of control signaling, transmit a second message of the two-step random access procedure including the second type of control signaling based on the first message, where the second type of control signaling schedules the UE with resources for a downlink shared channel, and communicate with the UE on the resources that are scheduled by the second message on the downlink shared channel.

Another apparatus for wireless communications at a base station is described. The apparatus may include means for receiving, from a UE, a first message of a two-step random access procedure, where an attribute or a content of the first message indicates a request for a second type of control signaling that includes fewer bits than a first type of control signaling, transmitting a second message of the two-step random access procedure including the second type of control signaling based on the first message, where the second type of control signaling schedules the UE with resources for a downlink shared channel, and communicating with the UE on the resources that are scheduled by the second message on the downlink shared channel.

A non-transitory computer-readable medium storing code for wireless communications at a base station is described. The code may include instructions executable by a processor to receive, from a UE, a first message of a two-step random access procedure, where an attribute or a content of the first message indicates a request for a second type of control signaling that includes fewer bits than a first type of control signaling, transmit a second message of the two-step random access procedure including the second type of control signaling based on the first message, where the second type of control signaling schedules the UE with resources for a downlink shared channel, and communicate with the UE on the resources that are scheduled by the second message on the downlink shared channel.

In some examples of the method, apparatuses, and non-transitory computer-readable medium described herein, the content of the first message includes an explicit request for the second type of control signaling.

Some examples of the method, apparatuses, and non-transitory computer-readable medium described herein may further include operations, features, means, or instructions for transmitting configuration information to the UE indicating a set of conditions for transmitting the first message with the attribute or the content to request the second type of control signaling.

In some examples of the method, apparatuses, and non-transitory computer-readable medium described herein, the set of conditions includes an indication to improve coverage of the second message, a threshold for a reference signal received power from the base station, a maximum power exposure threshold, or a combination thereof.

In some examples of the method, apparatuses, and non-transitory computer-readable medium described herein, the configuration information includes a set of attributes including a type of first message, a set of random access preamble sequences, a set of time resources, a set of random access occasions, or a combination thereof, where the attribute indicating the request for the second type of control signaling includes one or more attributes from the set of attributes.

In some examples of the method, apparatuses, and non-transitory computer-readable medium described herein, the configuration information may be transmitted in a system information block including remaining minimum system information or other system information.

In some examples of the method, apparatuses, and non-transitory computer-readable medium described herein, the configuration information includes an identifier for a group of UEs including the UE or a UE-specific identifier for the UE.

In some examples of the method, apparatuses, and non-transitory computer-readable medium described herein, the second type of control signaling includes DCI having fewer information bits, fewer cyclic redundancy check bits, or both, than the first type of control signaling.

A method of wireless communications at a UE is described. The method may include transmitting, to a base station, a first message of a four-step random access procedure, where an attribute of the first message indicates a request for a second type of control signaling that includes fewer bits than a first type of control signaling, receiving a second message of the four-step random access procedure including the second type of control signaling based on the first message, and communicating with the base station on resources scheduled by the second message on a downlink shared channel.

An apparatus for wireless communications at a UE is described. The apparatus may include a processor, memory coupled with the processor, and instructions stored in the memory. The instructions may be executable by the processor to cause the apparatus to transmit, to a base station, a first message of a four-step random access procedure, where an attribute of the first message indicates a request for a second type of control signaling that includes fewer bits than a first type of control signaling, receive a second message of the four-step random access procedure including the second type of control signaling based on the first message, and communicate with the base station on resources scheduled by the second message on a downlink shared channel.

Another apparatus for wireless communications at a UE is described. The apparatus may include means for transmitting, to a base station, a first message of a four-step random access procedure, where an attribute of the first message indicates a request for a second type of control signaling that includes fewer bits than a first type of control signaling, receiving a second message of the four-step random access procedure including the second type of control signaling based on the first message, and communicating with the base station on resources scheduled by the second message on a downlink shared channel.

A non-transitory computer-readable medium storing code for wireless communications at a UE is described. The code may include instructions executable by a processor to transmit, to a base station, a first message of a four-step random access procedure, where an attribute of the first message indicates a request for a second type of control signaling that includes fewer bits than a first type of control signaling, receive a second message of the four-step random access procedure including the second type of control signaling based on the first message, and communicate with the base station on resources scheduled by the second message on a downlink shared channel.

Some examples of the method, apparatuses, and non-transitory computer-readable medium described herein may further include operations, features, means, or instructions for receiving configuration information from the base station indicating a set of conditions for transmitting the first message with the attribute indicating the request for the second type of control signaling.

In some examples of the method, apparatuses, and non-transitory computer-readable medium described herein, the set of conditions includes an indication to improve coverage of the second message, a threshold for a reference signal received power from the base station, a maximum power exposure threshold, or a combination thereof.

In some examples of the method, apparatuses, and non-transitory computer-readable medium described herein, the configuration information includes a set of attributes including a type of first message, a set of random access preamble sequences, a set of time resources, a set of random access occasions, or a combination thereof, where the attribute indicating the request for the second type of control signaling includes one or more attributes from the set of attributes.

In some examples of the method, apparatuses, and non-transitory computer-readable medium described herein, the configuration information may be received in a system information block including remaining minimum system information or other system information.

Some examples of the method, apparatuses, and non-transitory computer-readable medium described herein may further include operations, features, means, or instructions for determining to transmit the first message of the four-step random access procedure with the attribute indicating the request for the second type of control signaling based on satisfying one or more conditions of the set of conditions.

In some examples of the method, apparatuses, and non-transitory computer-readable medium described herein, the configuration information includes an identifier for a group of UEs including the UE or a UE-specific identifier for the UE.

In some examples of the method, apparatuses, and non-transitory computer-readable medium described herein, the second type of control signaling includes DCI having fewer information bits, fewer cyclic redundancy check bits, or both, than the first type of control signaling.

A method of wireless communications at a base station is described. The method may include receiving, from a UE, a first message of a four-step random access procedure, where an attribute of the first message indicates a request for a second type of control signaling that includes fewer bits than a first type of control signaling, transmitting a second message of the four-step random access procedure including the second type of control signaling based on the first message, where the second type of control signaling schedules the UE with resources for a downlink shared channel, and communicating with the UE on resources that are scheduled by the second message on the downlink shared channel.

An apparatus for wireless communications at a base station is described. The apparatus may include a processor, memory coupled with the processor, and instructions stored in the memory. The instructions may be executable by the processor to cause the apparatus to receive, from a UE, a first message of a four-step random access procedure, where an attribute of the first message indicates a request for a second type of control signaling that includes fewer bits than a first type of control signaling, transmit a second message of the four-step random access procedure including the second type of control signaling based on the first message, where the second type of control signaling schedules the UE with resources for a downlink shared channel, and communicate with the UE on resources that are scheduled by the second message on the downlink shared channel.

Another apparatus for wireless communications at a base station is described. The apparatus may include means for receiving, from a UE, a first message of a four-step random access procedure, where an attribute of the first message indicates a request for a second type of control signaling that includes fewer bits than a first type of control signaling, transmitting a second message of the four-step random access procedure including the second type of control signaling based on the first message, where the second type of control signaling schedules the UE with resources for a downlink shared channel, and communicating with the UE on resources that are scheduled by the second message on the downlink shared channel.

A non-transitory computer-readable medium storing code for wireless communications at a base station is described. The code may include instructions executable by a processor to receive, from a UE, a first message of a four-step random access procedure, where an attribute of the first message indicates a request for a second type of control signaling that includes fewer bits than a first type of control signaling, transmit a second message of the four-step random access procedure including the second type of control signaling based on the first message, where the second type of control signaling schedules the UE with resources for a downlink shared channel, and communicate with the UE on resources that are scheduled by the second message on the downlink shared channel.

Some examples of the method, apparatuses, and non-transitory computer-readable medium described herein may further include operations, features, means, or instructions for transmitting configuration information to the UE indicating a set of conditions for transmitting the first message with the attribute indicating the request for the second type of control signaling.

In some examples of the method, apparatuses, and non-transitory computer-readable medium described herein, the set of conditions includes an indication to improve coverage of the second message, a threshold for a reference signal received power from the base station, a maximum power exposure threshold, or a combination thereof.

In some examples of the method, apparatuses, and non-transitory computer-readable medium described herein, the configuration information includes a set of attributes including a type of first message, a set of random access preamble sequences, a set of time resources, a set of random access occasions, or a combination thereof, where the attribute indicating the request for the second type of control signaling includes one or more attributes from the set of attributes.

In some examples of the method, apparatuses, and non-transitory computer-readable medium described herein, the configuration information may be transmitted in a system information block including remaining minimum system information or other system information.

In some examples of the method, apparatuses, and non-transitory computer-readable medium described herein, the configuration information includes an identifier for a group of UEs including the UE or a UE-specific identifier for the UE.

In some examples of the method, apparatuses, and non-transitory computer-readable medium described herein, the second type of control signaling includes DCI having fewer information bits, fewer cyclic redundancy check bits, or both, than the first type of control signaling.

DETAILED DESCRIPTION

Figure 1:
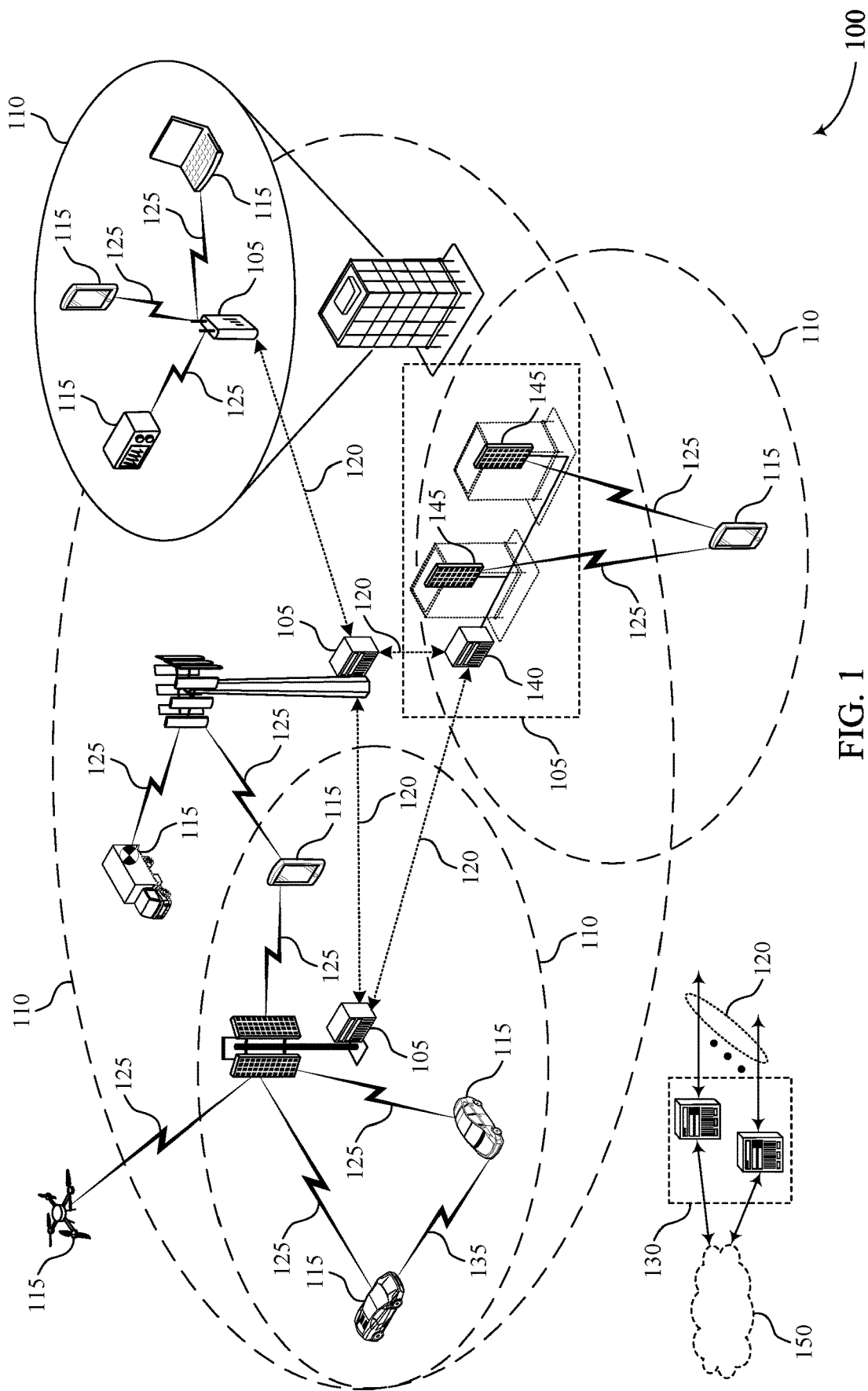
FIG. 1 illustrates an example of a system for wireless communications that supports compact downlink control information (DCI) for a two-step random access channel procedure in accordance with aspects of the present disclosure.

A user equipment (UE) may perform a two-step random access procedure to establish a Radio Resource Control (RRC) connection with a base station. A two-step random access procedure may include two messages between a UE and base station, after which the UE may have the RRC connection established with the base station. The first random access message, Message A, may correspond to the first and third messages of a four-step random access procedure, and the second random access message, Message B, may correspond to the second and fourth message of a four-step random access procedure. To initiate the two-step random access procedure, the UE may send a first random access message to the base station. The first random access message may include a random access preamble and uplink data, which indicates to the base station that the UE is requesting to establish the RRC connection. The base station may receive the first random access message and transmit a second random access message, including a random access response and an RRC contention resolution, to the UE. The second random access message may indicate contention resolution and completion of the random access procedure if the first random access message is successful. If the base station can detect the random access preamble from the first random access message, but the base station cannot decode the payload, the second message may request re-transmission of the first random access message on granted resources. After receiving the second random access message, the RRC connection establishment may be complete, and the UE may be connected to the base station.

The base station may transmit downlink control information (DCI) on a downlink control channel to schedule the second random access message of the two-step random access procedure. In some wireless communications systems, the DCI to schedule the second random access message may be a bottleneck for establishing RRC connections with UEs. The base station may transmit DCI on a control resource set with a resource allocation of, for example, two or three symbols. The DCI used in these systems may be based on a fallback DCI which may include, for example, a 40 bit payload and 24 cyclic redundancy check (CRC) bits. As such, in some cases, the DCI may be too large for the control resource set. This may slow down scheduling the second random access message, as the base station may have fewer transmit occasions with enough resources allocated to transmit the DCI.

A wireless communications system described herein may support two-step random access procedures that use a compact DCI for scheduling a second random access message of the two-step random access procedure. For example, a base station may transmit a compact DCI to a UE to schedule the second random access message of the two-step random access procedure. The compact DCI may include fewer information bits than another type of DCI (e.g., a fallback DCI). For example, a payload of the compact DCI may include fewer information bits, fewer CRC bits, or both. By using the compact DCI, the base station may more reliably transmit the compact DCI in a control resource set, which may reduce the bottleneck experienced by other systems and improve coverage of the second random access message of the two-step random access procedure The wireless communications system may support both the compact DCI and the larger DCI (e.g., a fallback DCI or any other type of control signaling or DCI that includes more bits than the compact DCI). For example, the base station may use the compact DCI for capable UEs and use the larger DCI for UEs which do not support the compact DCI. A UE may send the first random access message with an attribute that indicates a request for the compact DCI. The base station may receive the first random access message, detect the request, and send the compact DCI to schedule the second random access message. In some cases, the attribute may be based on a preamble sequence, a sequence set, a type, a format, time resources, a random access occasion, or a combination of these attributes, of the first random access message. For, the UE may request the compact DCI based on a random access preamble, or the UE may request the compact DCI based on contents of the data of the first random access message. In some cases, the UE may be configured with a set of conditions for requesting the compact DCI. In some cases, the set of conditions may include a reference signal received power (RSRP) threshold or a maximum power exposure (MPE) condition. In some cases, configuration information for the attributes or conditions may be sent via a system information block (SIB) including remaining minimum system information or other system information.

In some cases, a UE may perform a four-step random access procedure to establish an RRC connection with a base station. A four-step random access procedure may include four messages between a UE and base station, after which the UE may have the RRC connection established with the base station. To initiate the four-step random access procedure, the UE may send a first random access message to the base station. The first random access message may include a random access preamble, which indicates to the base station that the UE is requesting to establish the RRC connection. The base station may receive the first random access message and transmit a second random access message, including a random access response, to the UE. The base station may transmit DCI on a downlink control channel to schedule the second random access message. In a four-step random access procedure, the UE may decode the contents of the random access response and send a third random access message, including an RRC connection request, to the base station. After transmitting the third random access message, the UE may monitor for a fourth random access message from the base station, including an RRC contention resolution. After receiving the fourth random access message, the RRC connection establishment may be complete, and the UE may be connected to the base station.

In some wireless communications systems, the DCI to schedule the second random access message may be a bottleneck for establishing RRC connections with UEs. The base station may transmit DCI on a control resource set with a resource allocation of, for example, two or three symbols. The DCI used in these systems may be based on a fallback DCI which may include, for example, a 40 bit payload and 24 CRC bits. As such, in some cases, the DCI may be too large for the control resource set. This may slow down scheduling the second random access message, as the base station may have fewer transmit occasions with enough resources allocated to transmit the DCI.

A wireless communications system described herein may support four-step random access procedures that use a compact DCI for scheduling a second random access message of the four-step random access procedure. For example, a base station may transmit a compact DCI to a UE to schedule the second random access message of the four-step random access procedure. The compact DCI may include fewer information bits than another type of DCI (e.g., a fallback DCI). For example, a payload of the compact DCI may include fewer information bits or fewer CRC bits, or both. By using the compact DCI, the base station may more reliably transmit the compact DCI in a control resource set, which may reduce the bottleneck experienced by other systems and improve coverage of the second random access message of the four-step random access procedure.

The wireless communications system may support both the compact DCI and the larger DCI (e.g., a fallback DCI or any other type of control signaling or DCI that includes more bits than the compact DCI). For example, the base station may use the compact DCI for capable UEs and use the larger DCI for UEs which do not support the compact DCI. A UE may send the first random access message with an attribute that indicates a request for the compact DCI. The base station may receive the first random access message, detect the attribute, and send the compact DCI to schedule the second random access message. In some cases, the attribute may be based on a preamble sequence, a sequence set, a type, a format, time resources, a random access occasion, or a combination of these attributes, of the first random access message. In some cases, the UE may be configured with a set of conditions for requesting the compact DCI. In some cases, the set of conditions may include an RSRP threshold or an MPE condition. In some cases, configuration information for the attributes or conditions may be sent via a SIB including remaining minimum system information or other system information.

Aspects of the disclosure are initially described in the context of wireless communications systems. Aspects of the disclosure are further illustrated by and described with reference to apparatus diagrams, system diagrams, and flowcharts that relate to compact DCI for a two-step random access channel procedure.

FIG. 1 illustrates an example of a wireless communications system 100 that supports compact DCI for a two-step random access channel procedure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may perform a two-step random access procedure to establish an RRC connection with a base station 105. A two-step random access procedure may include two random access messages between a UE 115 and base station 105, after which the UE 115 may have the RRC connection established with the base station 105. A two-step random access procedure may include a first random access message from the UE 115 to the base station 105, message A, and a second random access message from the base station 105 to the UE 115, message B. Message A may include a first and third random access message of a four-step random access procedure, and message B may include a second and fourth random access message of a four-step random access procedure. Therefore, the UE 115 may send uplink data with a random access preamble for the message A, and the base station 105 may send a contention resolution with a random access response for the message B.

To initiate the two step random access procedure, the UE 115 may send the first random access message to the base station 105. The base station 105 may receive the first random access message and transmit a second random access message, including a random access response, to the UE 115. The base station 105 may transmit DCI on a downlink control channel to schedule the second random access message. After receiving the second random access message, the RRC connection establishment may be complete, and the UE 115 may be connected to the base station 105. If the base station 105 could detect the random access preamble but not decode the data of the first random access message, the base station 105 may allocate resources for the UE 115 to retransmit the first random access message.

Wireless communications system 100 may support two-step random access procedures that use a compact DCI for scheduling the second random access message of the two-step random access procedure. For example, a base station 105 may transmit a compact DCI to a UE 115 to schedule the second random access message. The compact DCI may include fewer information bits than other types of DCI (e.g., a fallback DCI or some other control signaling having more bits than the compact DCI). For example, a payload of the compact DCI may include fewer information bits, fewer CRC bits, or both, than the fallback DCI.

The wireless communications system 100 may support both the compact DCI and the larger DCI. A UE 115 may send the first random access message with an attribute or content that indicates a request for the compact DCI. The base station 105 may receive the first random access message, detect the request, and send the compact DCI to schedule the second random access message. In some cases, the UE 115 may be configured with a set of conditions for requesting the compact DCI. In some cases, configuration information for the attributes or conditions may be sent to UEs 115 via a SIB including remaining minimum system information or other system information.

Wireless communications system 100 may support four-step random access procedures that use a compact DCI for scheduling a second random access message of the four-step random access procedure. For example, a base station 105 may transmit a compact DCI to a UE 115 to schedule the second random access message. The compact DCI may include fewer information bits than a second type of DCI (e.g., a fallback DCI or some other control signaling having more bits than the compact DCI). For example, a payload of the compact DCI may include fewer information bits or a fewer CRC bits, or both, than the fallback DCI. The wireless communications system may support both the compact DCI and the larger DCI. A UE 115 may send the first random access message with an attribute that indicates a request for the compact DCI. The base station 105 may receive the first random access message, detect the attribute, and send the compact DCI to schedule the second random access message. In some cases, the UE 115 may be configured with a set of conditions for requesting the compact DCI. In some cases, configuration information for the attributes or conditions may be sent to UEs 115 via a SIB including remaining minimum system information or other system information.

Figure 2:
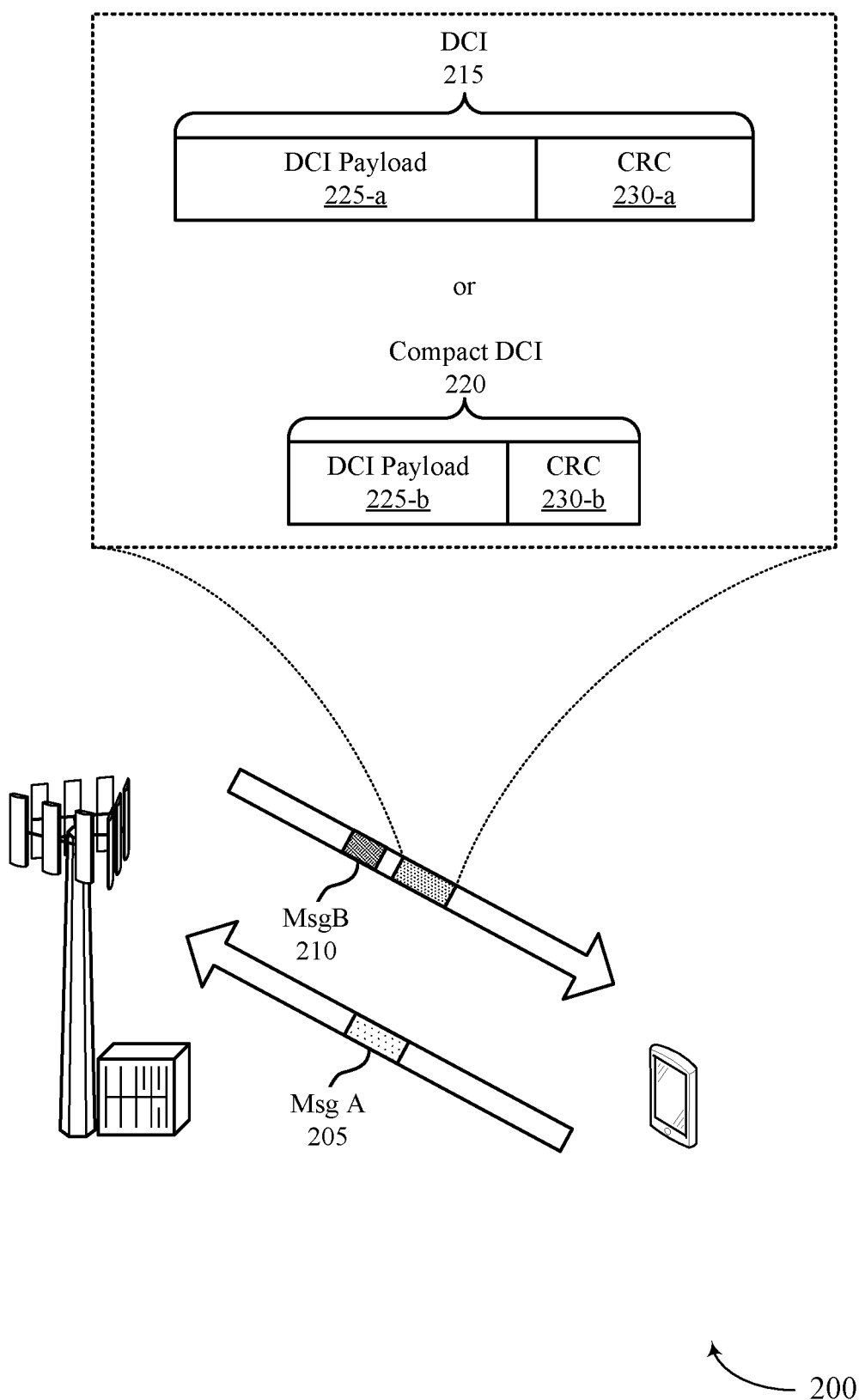
FIG. 2 illustrates an example of a wireless communications system that supports compact DCI for a two-step random access channel procedure in accordance with aspects of the present disclosure.

FIG. 2 illustrates an example of a wireless communications system 200 that supports compact DCI for a two-step random access channel procedure in accordance with aspects of the present disclosure. In some examples, wireless communications system 200 may implement aspects of wireless communication system 100. The wireless communications system 200 includes UE 115-*a* and base station 105-*a*, which may be respective examples of a UE 115 and a base station 105 as described with reference to FIG. 1.

UE 115-*a* may perform a two-step random access procedure to establish an RRC connection with base station 105-*a*. A two-step random access procedure may include two random access messages between UE 115-*a* and base station 105-*a*, after which UE 115-*a* may have the RRC connection established with base station 105-*a*. In some cases, UE 115-*a* may initiate the random access procedure upon powering on, initiating the RRC connection for initial access to the wireless communications system 200. Additionally, or alternatively, UE 115-*a* may perform a random access procedure to re-establish an RRC connection, when being handed over to another base station 105, for positioning purposes, or when UE 115-*a* has pending data but does not have an existing RRC connection.

To initiate the two step random access procedure, UE 115-*a* may send a first random access message 205 (e.g., Message A or MsgA) to base station 105-*a*. Message A may include a random access preamble and data on an uplink shared channel. Message A may indicate to base station 105-*a* that UE 115-*a* is requesting to establish the RRC connection. UE 115-*a* may send the first random access message 205 during a random access occasion, configured for UEs 115 to transmit random access messages and initiate the random access procedure. Message A of a two-step random access procedure may correspond to Message 1 and Message 3 of a four-step random access procedure.

Base station 105-*a* may receive the first random access message 205 and transmit a second random access message 210 in response. The second random access message 210 may include a random access response and a contention resolution. In some cases, the second random access message 210 may be referred to as Message B or MsgB. The second random access message 210 may correspond to Message 2 and Message 4 of a four-step random access procedure. If base station 105-*a* can detect the random access preamble but not decode the data of the first random access message 205, base station 105-*a* may schedule UE 115-*a* to retransmit the first random access message 205.

Base station 105-*a* may transmit DCI to schedule the second random access message 210. Base station 105-*a* may scramble the DCI with a random access radio network temporary identifier (RA-RNTI) corresponding to the first random access message 205. UE 115-*a* may attempt to detect the DCI with the corresponding RA-RNTI to receive the scheduling information for the second random access message 210. After receiving the second random access message 210, the RRC connection establishment may be complete, and UE 115-*a* may be connected to base station 105-*a*.

In some wireless communications systems, the DCI to schedule the second random access message 210 may be a bottleneck for establishing RRC connections with UEs 115. For example, a base station 105 may transmit DCI 215 on a control resource set. The control resource set may have a size limit based on a configuration of the wireless communications system. For example, a control resource set may have a size limit based on a configuration of the wireless communications system. For example, a control resource set may include a resource allocation of, for example, two or three symbols. The DCI 215 used in these systems may be based on a fallback DCI (e.g., an NR fallback DCI). Fallback DCI may include, for example, a 40 bit payload 225-*a* and 24 bit CRC 230-*a*. As such, the DCI 215 may be too large for the control resource set or may otherwise include more bits than necessary to covey the information needed to schedule a random access message. This may slow down scheduling the second random access message 210, as the base station 105 may have fewer transmit occasions with enough resources allocated to transmit the DCI 215. Additionally or alternatively, DCI 215 may result in a waste of overhead resources and contribute to inefficiency or latency in a wireless communications system.

The wireless communications system 200 may support techniques that use a compact DCI 220 for scheduling a second random access message 210 of a two-step random access procedure. For example, base station 105-*a* may transmit a compact DCI 220 to UE 115-*a* to schedule the second random access message 210. In some cases, the compact DCI 220 may include fewer information bits than the DCI 215, fewer CRC bits, or both. For example, a payload 225-*b* of the compact DCI 220 may be 24 information bits as compared to a payload 225-*a* of 40 bits in DCI 215. As another example, the CRC 230-*b* of compact DCI 220 may include 16 CRC bits as compared to the 24 bit CRC 230-*a*. By using the compact DCI 220, base station 105-*a* may more reliably transmit the compact DCI in a control resource set, which may reduce the bottleneck experienced by other systems and improve coverage of Message B of two-step random access procedures. For example, base station 105-*a* may then send random access responses and contention resolution more reliably to establish RRC connections for more UEs 115 in the wireless communications system 200.

The wireless communications system 200 may support both the compact DCI 220 and the DCI 215. For example, base station 105-*a* may use the compact DCI 220 for capable UEs and use the DCI 215 for UEs 115 which do not support the compact DCI 220. In some cases, UE 115-*a* may be configured with a set of conditions for requesting the compact DCI 220. For example, if base station 105-*a* detects that there is a bottleneck for sending random access responses, UE 115-*a* may be configured to request the compact DCI 220 instead of the DCI 215.

In some cases, UE 115-*a* may indicate a request for the compact DCI 220 based on contents of the data transmitted on the uplink shared channel of the first random access message 205. In some cases, UE 115-*a* may include values for certain fields which implicitly indicate the request for the compact DCI 220. Additionally, or alternatively, UE 115-*a* may send the first random access message 205 with an attribute that indicates a request for the compact DCI 220. In some cases, the attribute may be based on a type, a format, a sequence set, time resources, a random access occasion, or a combination thereof, of the first random access message 205.

Base station 105-*a* may receive the first random access message 205, detect the request, and send the compact DCI 220 to schedule the second random access message 210. For example, UE 115-*a* may use a certain random access sequence which is associated with the compact DCI 220.

In some cases, different types of first random access messages 205 may have different lengths, different, contents, different encodings, etc. Base station 105-*a* may receive the first random access message 205, determine the type of the first random access message 205, and determine that the type is associated with the compact DCI 220. Base station 105-*a* may then determine to transmit the compact DCI 220 to schedule the second random access message 210. In an example, UE 115-*a* may use a first type of the first random access message 205 which is associated with the compact DCI 220. Base station 105-*a* may receive the first random access message with the associated random access sequence and use the compact DCI 220 accordingly.

In some cases, a subset of random access occasions may be configured to be associated with the compact DCI 220. UE 115-*a* may transmit the first random access message 205 on a random access occasion which is associated with the compact DCI 220, and this may indicate a request for the compact DCI 220 to base station 105-*a*. UEs 115 which do not support the compact DCI 220 may transmit the first random access message 205 using random access occasions which are associated with the DCI 215. Additionally, or alternatively, a subset frequency resources may be associated with the compact DCI 220. If a UE 115 transmits a first random access message 205 on one of the associated tones, a base station 105 may determine that the UE 115 is requesting the second random access message 210 to be scheduled by the compact DCI 220. First random access messages 205 transmitted on other frequency resources may be associated with the DCI 215, and the base station 105 may schedule the second random access message 210 using the DCI 215. Similarly, some formats of the first random access message 205 may be associated with the compact DCI 220, where the use of other formats may implicitly indicate a request for the DCI 215.

In some cases, base station 105-*a* may send configuration information to UE 115-*a* for the compact DCI 220. For example, base station 105-*a* may indicate or configure a set of conditions to the UE 115-*a*, which may trigger UE 115-*a* to request the compact DCI 220 upon detecting one or more of the configured conditions. In some cases, the set of conditions may include an RSRP threshold or an MPE condition. For example, if an RSRP measurement of a synchronization signal block satisfies the RSRP threshold configured by base station 105-*a* or if UE 115-*a* meets the MPE condition, UE 115-*a* may send the first random access message 205 with the attribute that indicates a request for the compact DCI 220.

In some cases, the configuration information may include a set of attributes which are associated with the compact DCI 220. For example, base station 105-*a* may indicate which random access preambles, type, format, sequence set, time resources, or random access occasions, or any combination thereof, are associated with the compact DCI 220. For example, base station 105-*a* may configure a first set of resources (e.g., time resources, frequency resources, or both) which are associated with the compact DCI 220. If a UE 115 transmits the first random access message 205 using the configured resources associated with the compact DCI 220, this may indicate a request for a base station 105 to transmit the compact DCI 220 to schedule the second random access message 210. Base station 105-*a* may configure, or reserve, these resources in the wireless communications system 200. Additionally, or alternatively, base station 105-*a* may configure, or reserve, certain types of the first random access message 205, preamble sequences, or formats of the first random access message 205. Using one of the reserved preamble sequences, types, or formats for the first random access message 205 may indicate a request for the compact DCI 220. Using another preamble sequence, type, or format which is not configured to be associated with the compact DCI 220 may indicate a request for the DCI 215.

In some cases, the configuration information may be sent via control signaling or system information such as a SIB including remaining minimum system information or other system information. In some examples, the configuration information may be sent via a system synchronization block. In some cases, the usage of compact DCI 220 or DCI 215 may be indicated for a set, or group, of UEs 115, or for all UEs 115. For example, base station 105-a may indicate that all UEs 115 are to use, or request, the DCI 215 (or the compact DCI 220). In some cases, base station 105-a may indicate for capable UEs 115 to request the compact DCI 220, or for capable UEs 115 to request the compact DCI 220 based on meeting one or more criteria. In some cases, base station 105-a may indicate for just a subset of UEs 115 to use the compact DCI 220. In some cases, the indications may be sent based on UE identifiers, group UE identifiers, beam direction, or a combination thereof.

In some examples, UE 115-a may perform a four-step random access procedure to establish an RRC connection with base station 105-a. A four-step random access procedure may include four random access messages between UE 115-a and base station 105-a, after which UE 115-a may have the RRC connection established with base station 105-a. In some cases, UE 115-a may initiate the four-step random access procedure upon powering on, initiating the RRC connection for initial access to the wireless communications system 200. Additionally, or alternatively, UE 115-a may perform a random access procedure to re-establish an RRC connection, when being handed over to another base station 105, for positioning purposes, or when UE 115-a has pending data but does not have an existing RRC connection.

To initiate the four-step random access procedure, UE 115-a may send a first random access message (e.g., Message 1 or Msg1) to base station 105-a. Message 1 may include a random access preamble, which indicates to base station 105-a that UE 115-a is requesting to establish the RRC connection. UE 115-a may send the first random access message during a random access occasion, configured for UEs 115 to transmit random access messages and initiate the random access procedure.

Base station 105-a may receive the first random access message and transmit a second random access message in response. The second random access message may include a random access response. In some cases, the second random access message may be referred to as Message 2 or Msg2.

Base station 105-a may transmit DCI to schedule the second random access message. Base station 105-a may scramble the DCI with an RA-RNTI corresponding to the first random access message. UE 115-a may attempt to detect the DCI with the corresponding RA-RNTI to receive the scheduling information for the second random access message.

In a four-step random access procedure, UE 115-a may decode the contents of the random access response and send a third random access message to base station 105-a. The third random access message may be an RRC connection request. After transmitting the third random access message, UE 115-a may monitor for a fourth random access message from base station 105-a, including an RRC contention resolution. After receiving the fourth random access message, the RRC connection establishment may be complete, and UE 115-a may be connected to base station 105-a.

In some wireless communications systems, the DCI to schedule the second random access message may be a bottleneck for establishing RRC connections with UEs 115. For example, a base station 105 in these systems may transmit DCI 215 on a control resource set. The control resource set may have a size limit based on a configuration of the wireless communications system. For example, a control resource set may include a resource allocation of, for example, two or three symbols. The DCI 215 used in these systems may be based on a fallback DCI (e.g., an NR fallback DCI). Fallback DCI may include, for example, a 40 bit payload 225-a and 24 bit CRC 230-a. As such, the DCI 215 may be too large for the control resource set or may otherwise include more bits than necessary to convey the information needed to schedule a random access message. This may slow down scheduling the second random access message, as the base station 105 may have fewer transmit occasions with enough resources allocated to transmit the DCI 215. Additionally or alternatively, DCI 215 may result in a waste of overhead resources and contribute to inefficiency or latency in a wireless communications system.

The wireless communications system 200 may support techniques that use a compact DCI 220 for scheduling a second random access message of a four-step random access procedure. For example, base station 105-a may transmit a compact DCI 220 to UE 115-a to schedule the second random access message. In some cases, the compact DCI 220 may include fewer information bits than the DCI 215, fewer CRC bits, or both. For example, a payload 225-b of the compact DCI 220 may be 24 information bits as compared to a payload 225-a of 40 bits in DCI 215. As another example, the CRC 230-b of compact DCI 220 may include 15 CRC bits as compared to the 24 bit CRC 230-a. By using the compact DCI 220, base station 105-a may more reliably transmit the compact DCI in a control resource set, which may reduce the bottleneck experienced by other systems and improve coverage of Message 2 for four-step random access procedures. For example, base station 105-a may then send random access responses more reliably to establish more UEs 115 in the wireless communications system 200.

The wireless communications system 200 may support both the compact DCI 220 and the DCI 215. For example, base station 105-a may use the compact DCI 220 for capable UEs and use the DCI 215 for UEs 115 which do not support the compact DCI 220. In some cases, UE 115-a may be configured with a set of conditions for requesting the compact DCI 220. For example, if base station 105-a detects that there is a bottleneck for sending random access responses, UE 115-a may be configured to request the compact DCI 220 instead of the DCI 215.

UE 115-a may send the first random access message with an attribute that indicates a request for the compact DCI 220. Base station 105-a may receive the first random access message, detect the attribute, and send the compact DCI 220 to schedule the second random access message. In some cases, the attribute may be based on a type, a format, a sequence set, time resources, a random access occasion, or a combination thereof, of the first random access message. For example, UE 115-a may use a certain random access sequence which is associated with the compact DCI 220. Base station 105-a may receive the first random access message with the associated random access sequence and use the compact DCI 220 accordingly.

In some cases, different types of first random access messages may have different lengths, different, contents, different encodings, etc. Base station 105-*a* may receive the first random access message, determine the type of the first random access message, and determine that the type is associated with the compact DCI 220. Base station 105-*a* may then determine to transmit the compact DCI 220 to schedule the second random access message. In an example, UE 115-*a* may use a first type of the first random access message which is associated with the compact DCI 220. Base station 105-*a* may receive the first random access message with the associated random access sequence and use the compact DCI 220 accordingly.

In some cases, a subset of random access occasions may be configured to be associated with the compact DCI 220. UE 115-*a* may transmit the first random access message on a random access occasion which is associated with the compact DCI 220, and this may indicate a request for the compact DCI 220 to base station 105-*a*. UEs 115 which do not support the compact DCI 220 may transmit the first random access message using random access occasions which are associated with the DCI 215. Additionally, or alternatively, a subset frequency resources may be associated with the compact DCI 220. If a UE 115 transmits a first random access message on one of the associated tones, a base station 105 may determine that the UE 115 is requesting the second random access message to be scheduled by the compact DCI 220. First random access messages transmitted on other frequency resources may be associated with the DCI 215, and the base station 105 may schedule the second random access message using the DCI 215. Similarly, some formats of the first random access message may be associated with the compact DCI 220, where the use of other formats may implicitly indicate a request for the DCI 215.

In some cases, base station 105-*a* may send configuration information to UE 115-*a* for the compact DCI 220. For example, base station 105-*a* may indicate or configure a set of conditions to the UE 115-*a*, which may trigger the UE 115-*a* to request the compact DCI 220 upon detecting one or more of the configured conditions. In some cases, the set of conditions may include an RSRP threshold or an MPE condition. For example, if an RSRP measurement of a synchronization signal block satisfies the RSRP threshold configured by the base station 105-*a* or if UE 115-*a* meets the MPE condition, UE 115-*a* may send the first random access message with the attribute that indicates a request for the compact DCI 220.

In some cases, the configuration information may include a set of attributes which are associated with the compact DCI 220. For example, base station 105-*a* may indicate which random access preambles, type, format, sequence set, time resources, or random access occasions are associated with the compact DCI 220. For example, base station 105-*a* may configure a first set of resources (e.g., time resources, frequency resources, or both) which are associated with the compact DCI 220. If a UE 115 transmits the first random access message using the configured resources associated with the compact DCI 220, this may indicate a request for a base station 105 to transmit the compact DCI 220 to schedule the second random access message. In some cases, base station 105-*a* may configure, or reserve, these resources in the wireless communications system 200. Additionally, or alternatively, base station 105-*a* may configure, or reserve, certain types of the first random access message, preamble sequences, or formats of the first random access message to be associated with the compact DCI 220. Using one of the reserved preamble sequences, types, or formats for the first random access message may indicate a request for the compact DCI 220. Using another preamble sequence, type, or format which is not configured to be associated with the compact DCI 220 may indicate a request for the DCI 215.

In some cases, the configuration information may be sent via control signaling or system information signaling such as a SIB including remaining minimum system information or other system information. In some examples, the configuration information may be sent via a system synchronization block. In some cases, the usage of compact DCI 220 or DCI 215 may be indicated for a set, or group, of UEs 115, or for all UEs 115. For example, base station 105-*a* may indicate that all UEs 115 are to use, or request, the DCI 215 (or the compact DCI 220). In some cases, base station 105-*a* may indicate for capable UEs 115 to request the compact DCI 220, or for capable UEs 115 to request the compact DCI 220 based on meeting one or more criteria. In some cases, base station 105-*a* may indicate for just a subset of UEs 115 to use the compact DCI 220. In some cases, the indications may be sent based on UE identifiers, group UE identifiers, beam direction, or a combination thereof.

Figure 3:
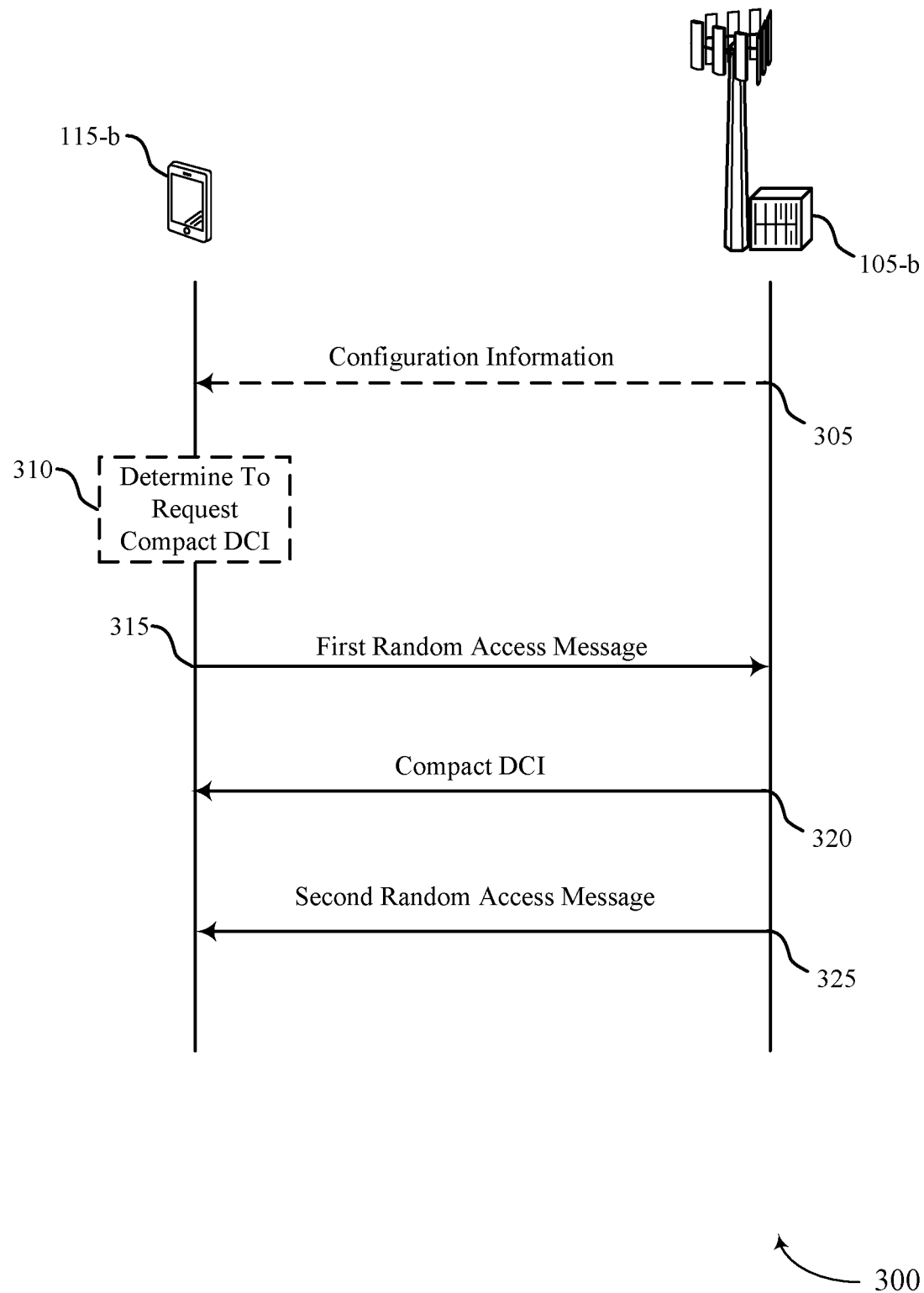
FIG. 3 illustrates an example of a process flow that supports compact DCI for a two-step random access channel procedure in accordance with aspects of the present disclosure.

FIG. 3 illustrates an example of a process flow 300 that supports compact DCI for a two-step random access channel procedure in accordance with aspects of the present disclosure. In some examples, process flow 300 may implement aspects of wireless communication system 100. The process flow 300 may include UE 115-*b* and base station 105-*b*, which may be respective examples of a UE 115 and a base station 105 described with reference to FIGS. 1 and 2.

UE 115-*b* may perform a two-step random access procedure to establish an RRC connection with base station 105-*b*. UE 115-*b* may support using two types of DCI for a second message (e.g., Message B) of the two-step random access procedure. Using the second type of DCI may improve coverage of the second random access message of the two-step random access procedure.

UE 115-*b* may monitor for synchronization signal blocks and receive information for system information blocks based on the synchronization signal blocks. In some cases, at 305, UE 115-*b* may receive configuration information from base station 105-*b* indicating a set of conditions for transmitting a first message of the random access procedures with an attribute or message content indicating a request for the second type of control signaling (e.g., the compact DCI).

The set of conditions may include an indication to improve coverage of the second message, a threshold for a reference signal received power from base station 105-*b*, an MPE threshold, or a combination thereof. In some cases, the configuration information may include a set of attributes including a type of the first message, a set of random access preamble sequences, a set of time resources, a set of random access occasions, or a combination thereof, where the attribute indicating the request for the second type of control signaling includes one or more attributes from the set of attributes. The configuration information may be received in a system information block including remaining minimum system information or other system information.

At 310, UE 115-*b* may determine to request the compact DCI based on meeting one or more of the criteria for requesting the second type of control signaling. At 315, UE 115-*b* may transmit, to base station 105-*b*, the first message of the two-step random access procedure, where an attribute or content of the first message indicates a request for a second type of control signaling. The second type of control signaling may include fewer bits than a first type of control signaling. For example, the second type of control signaling may be the compact DCI, and the first type of control signaling may be a fallback DCI format. In some cases, the first message may be a first random access message including a random access preamble and data on an uplink shared channel to initiate the random access procedure.

At 320, UE 115-b may receive a second message of the two-step random access procedure including the second type of control signaling based on the first message. For example, base station 105-b may transmit the second type of control signaling to schedule the second message of the random access procedure. The second message of the random access procedure may be, for example, message B of a two-step random access procedure, including a random access response and a contention resolution At 325, UE 115-b may communicate with base station 105-b on resources scheduled by the second message on a downlink shared channel. For example, base station 105-b may transmit the random access response and contention resolution on the downlink shared channel. After performing the two-step random access procedure and receiving the second random access message, UE 115-b may have an RRC connection established with base station 105-b.

In some examples, UE 115-b may perform a four-step random access procedure to establish an RRC connection with base station 105-b. UE 115-b may support using two types of DCI for a second message (e.g., Message 2) of the four-step random access procedure. Using the second type of DCI may improve coverage of the second random access message of the four-step random access procedure.

UE 115-b may monitor for synchronization signal blocks and receive information for system information blocks based on the synchronization signal blocks. In some cases, at 305, UE 115-b may receive configuration information from base station 105-b indicating a set of conditions for transmitting a first message of the random access procedures with an attribute indicating a request for the second type of control signaling (e.g., the compact DCI).

The set of conditions may include an indication to improve coverage of the second message, a threshold for a reference signal received power from base station 105-b, an MPE threshold, or a combination thereof. In some cases, the configuration information may include a set of attributes including a type of the first message, a set of random access preamble sequences, a set of time resources, a set of random access occasions, or a combination thereof, wherein the attribute indicating the request for the second type of control signaling comprises one or more attributes from the set of attributes. The configuration information may be received in a system information block including remaining minimum system information or other system information.

At 310, UE 115-b may determine to request the compact DCI based on meeting one or more of the criteria for requesting the second type of control signaling. At 315, UE 115-b may transmit, to base station 105-b, the first message of the four-step random access procedure, where an attribute of the first message indicates a request for a second type of control signaling. The second type of control signaling may include fewer bits than a first type of control signaling. For example, the second type of control signaling may be the compact DCI, and the first type of control signaling may be a fallback DCI format. In some cases, the first message may be a first random access message including a random access preamble to initiate the random access procedure.

At 320, UE 115-b may receive a second message of the four-step random access procedure including the second type of control signaling based on the first message. For example, base station 105-b may transmit the second type of control signaling to schedule the second message of the random access procedure, which may be a random access response.

At 325, UE 115-b may communicate with base station 105-b on resources scheduled by the second message on a downlink shared channel. For example, base station 105-b may transmit the random access response on the downlink shared channel.

UE 115-b may transmit a third message of the random access procedure to base station 105-b. The third message may include an RRC connection request. Base station 105-b may transmit a fourth message of the random access procedure, an RRC connection complete message, in response. After performing the four-step random access procedure, UE 115-b may have an RRC connection established with base station 105-b.

Figure 4:
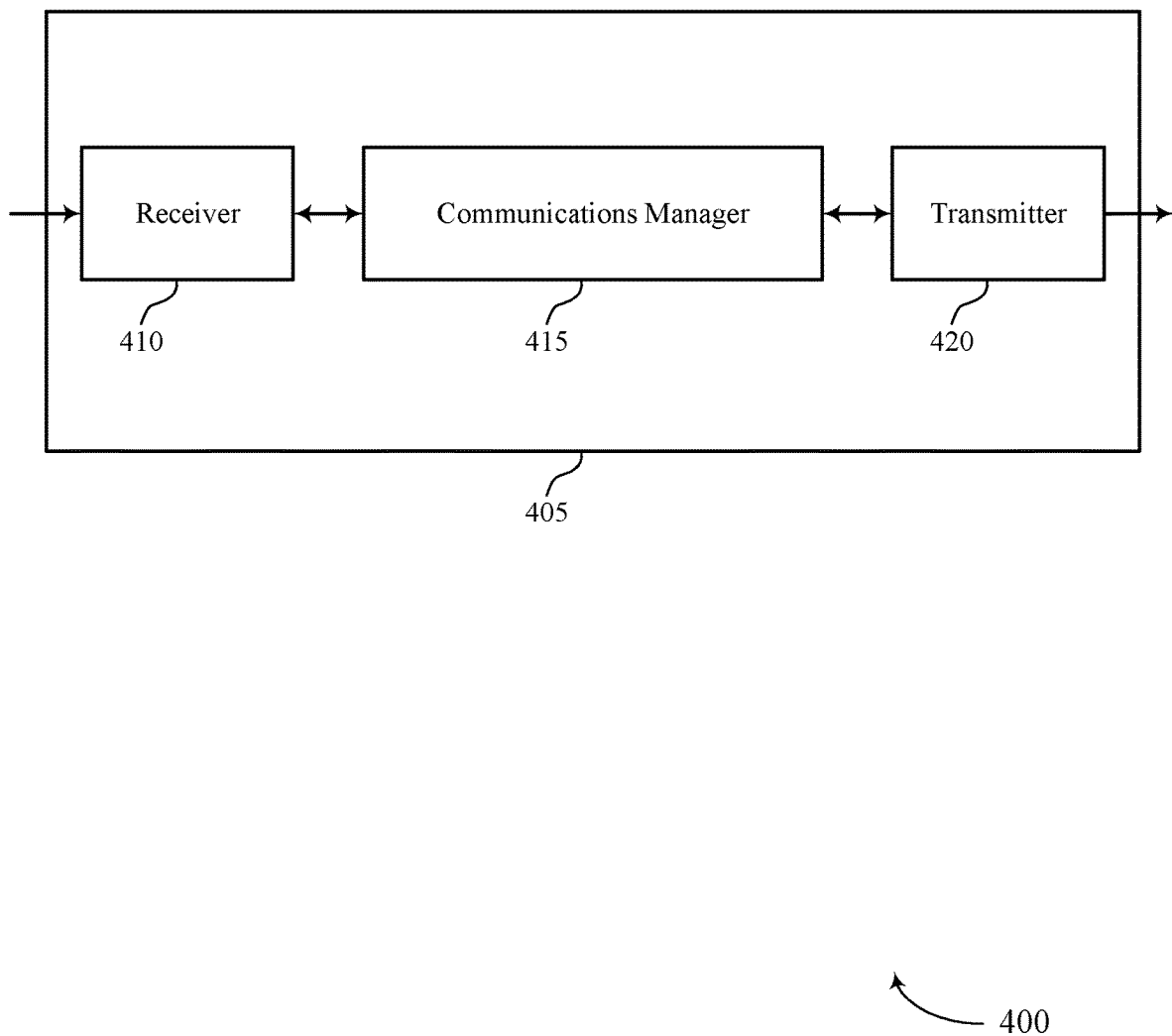
FIGS. 4 and 5 show block diagrams of devices that support compact DCI for a two-step random access channel procedure in accordance with aspects of the present disclosure.

FIG. 4 shows a block diagram 400 of a device 405 that supports compact DCI for a two-step random access channel procedure in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to compact DCI for a two-step random access channel procedure, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit, to a base station, a first message of a two-step random access procedure, where an attribute or a content of the first message indicates a request for a second type of control signaling that includes fewer bits than a first type of control signaling, receive a second message of the two-step random access procedure including the second type of control signaling based on the first message, and communicate with the base station on resources based on the second message. The communications manager 415 may be an example of aspects of the communications manager 710 described herein.

In some cases, the communications manager 415 may transmit, to a base station, a first message of a four-step random access procedure, where an attribute of the first message indicates a request for a second type of control signaling that includes fewer bits than a first type of control signaling, receive a second message of the four-step random access procedure including the second type of control signaling based on the first message, and communicate with the base station on resources scheduled by the second message on a downlink shared channel. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 415 as described herein may be implemented to realize one or more potential advantages. One implementation may allow a UE 115 to reliably establish an RRC connection with a base station 105. For example, the UE 115 may request for compact DCI to improve coverage of a second message of a two-step random access procedure and prevent a bottleneck of UEs 115 establishing RRC connections.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
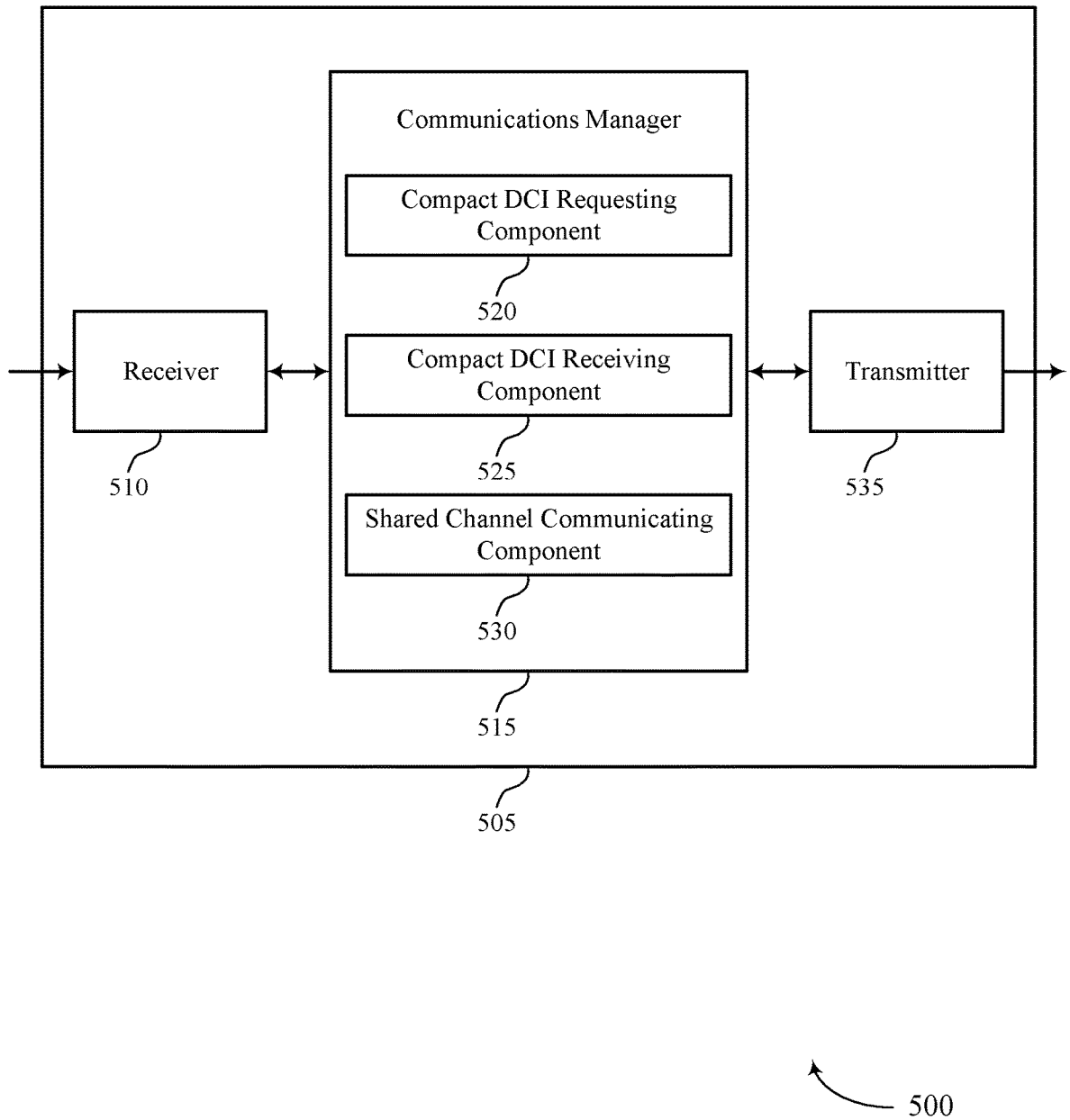

FIG. 5 shows a block diagram 500 of a device 505 that supports compact DCI for a two-step random access channel procedure in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to compact DCI for a two-step random access channel procedure, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a compact DCI requesting component 520, a compact DCI receiving component 525, and a shared channel communicating component 530. The communications manager 515 may be an example of aspects of the communications manager 710 described herein.

The compact DCI requesting component 520 may transmit, to a base station, a first message of a two-step random access procedure, where an attribute or a content of the first message indicates a request for a second type of control signaling that includes fewer bits than a first type of control signaling.

The compact DCI receiving component 525 may receive a second message of the two-step random access procedure including the second type of control signaling based on the first message.

The shared channel communicating component 530 may communicate with the base station on resources based on the second message.

In some cases, the compact DCI requesting component 520 may transmit, to a base station, a first message of a four-step random access procedure, where an attribute of the first message indicates a request for a second type of control signaling that includes fewer bits than a first type of control signaling. In some cases, the compact DCI receiving component 525 may receive a second message of the four-step random access procedure including the second type of control signaling based on the first message. In some cases, the shared channel communicating component 530 may communicate with the base station on resources scheduled by the second message on a downlink shared channel.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
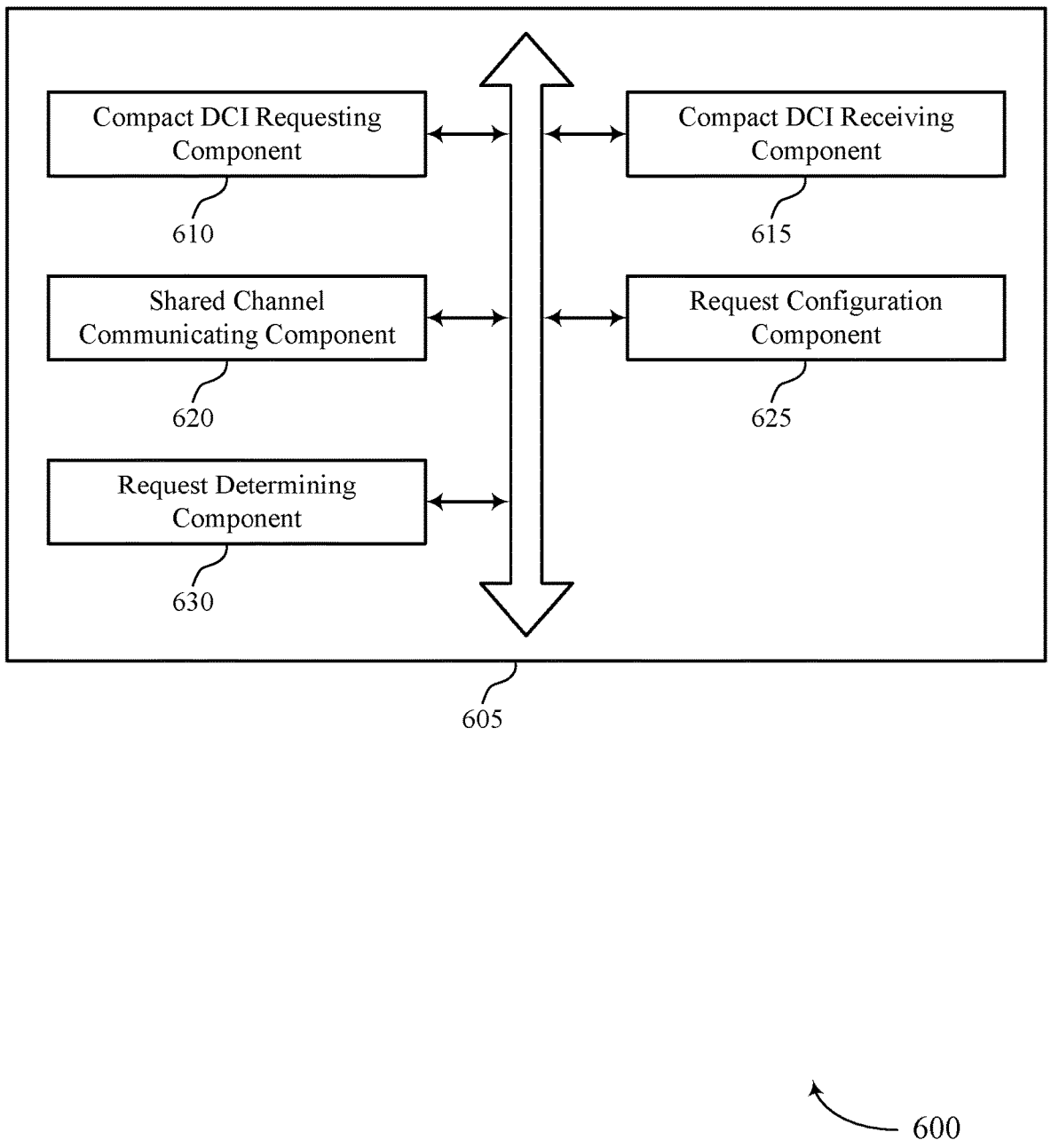
FIG. 6 shows a block diagram of a communications manager that supports compact DCI for a two-step random access channel procedure in accordance with aspects of the present disclosure.

FIG. 6 shows a block diagram 600 of a communications manager 605 that supports compact DCI for a two-step random access channel procedure in accordance with aspects of the present disclosure. The communications manager 605 may be an example of aspects of a communications manager 415, a communications manager 515, or a communications manager 710 described herein. The communications manager 605 may include a compact DCI requesting component 610, a compact DCI receiving component 615, a shared channel communicating component 620, a request configuration component 625, and a request determining component 630. Each of these modules may communicate, directly or indirectly, with one another (e.g., via one or more buses).

The compact DCI requesting component 610 may transmit, to a base station, a first message of a two-step random access procedure, where an attribute or a content of the first message indicates a request for a second type of control signaling that includes fewer bits than a first type of control signaling. In some cases, the content of the first random access message includes an explicit request for the second type of control signaling.

The compact DCI receiving component 615 may receive a second message of the two-step random access procedure including the second type of control signaling based on the first message. In some cases, the second type of control signaling includes DCI having fewer information bits, fewer cyclic redundancy check bits, or both, than the first type of control signaling.

The shared channel communicating component 620 may communicate with the base station on resources based on the second message. The request configuration component 625 may receive configuration information from the base station indicating a set of conditions for transmitting the first message with the attribute or the content to request the second type of control signaling.

In some cases, the set of conditions includes an indication to improve coverage of the second message, a threshold for a reference signal received power from the base station, a maximum power exposure threshold, or a combination thereof. In some cases, the configuration information includes a set of attributes including a type of first message, a set of random access preamble sequences, a set of time resources, a set of random access occasions, or a combination thereof, where the attribute indicating the request for the second type of control signaling includes one or more attributes from the set of attributes.

In some cases, the configuration information is received in a system information block including remaining minimum system information or other system information. In some cases, the configuration information includes an identifier for a group of UEs including the UE or a UE-specific identifier for the UE.

The request determining component 630 may determine to transmit the first message of the two-step random access procedure with the attribute or the content indicating the request for the second type of control signaling based on satisfying one or more conditions of the set of conditions.

The compact DCI requesting component 610 may transmit, to a base station, a first message of a four-step random access procedure, where an attribute of the first message indicates a request for a second type of control signaling that includes fewer bits than a first type of control signaling. The compact DCI receiving component 615 may receive a second message of the four-step random access procedure including the second type of control signaling based on the first message The shared channel communicating component 620 may communicate with the base station on resources scheduled by the second message on a downlink shared channel.

The request configuration component 625 may receive configuration information from the base station indicating a set of conditions for transmitting the first message with the attribute indicating the request for the second type of control signaling. The request determining component 630 may determine to transmit the first message of the four-step random access procedure with the attribute indicating the request for the second type of control signaling based on satisfying one or more conditions of the set of conditions.

Figure 7:
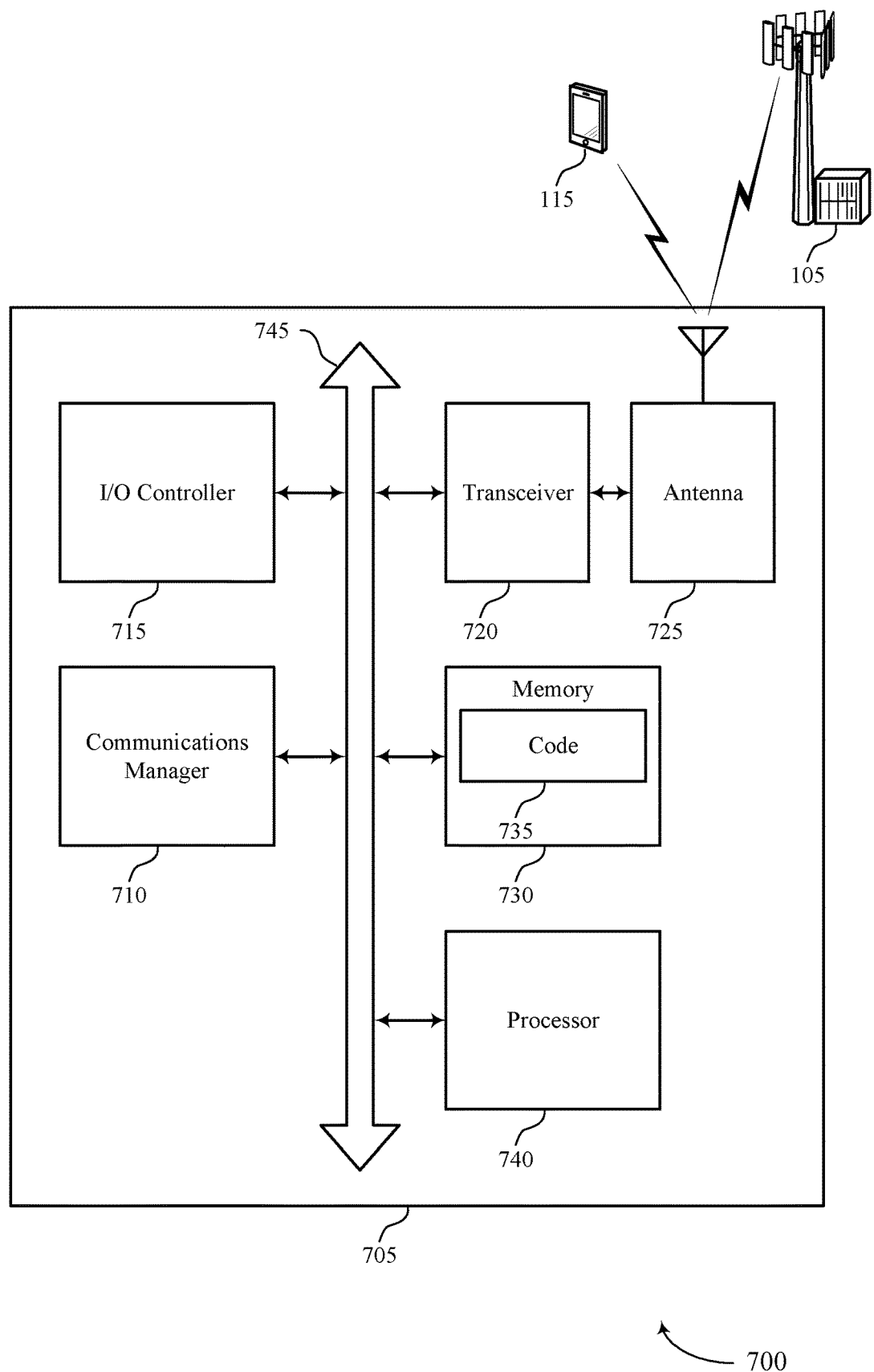
FIG. 7 shows a diagram of a system including a device that supports compact DCI for a two-step random access channel procedure in accordance with aspects of the present disclosure.

FIG. 7 shows a diagram of a system 700 including a device 705 that supports compact DCI for a two-step random access channel procedure in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit, to a base station, a first message of a two-step random access procedure, where an attribute or a content of the first message indicates a request for a second type of control signaling that includes fewer bits than a first type of control signaling, receive a second message of the two-step random access procedure including the second type of control signaling based on the first message, and communicate with the base station on resources based on the second message.

In some cases, the communications manager 710 may transmit, to a base station, a first message of a four-step random access procedure, where an attribute of the first message indicates a request for a second type of control signaling that includes fewer bits than a first type of control signaling, receive a second message of the four-step random access procedure including the second type of control signaling based on the first message, and communicate with the base station on resources scheduled by the second message on a downlink shared channel.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting compact DCI for a two-step random access channel procedure).

Based on requesting a compact DCI for a second message of a four-step random access procedure, a processor of a UE 115 (e.g., controlling a receiver 510, a transmitter 535, or the transceiver 720) may reduce power use by quickly establishing an RRC connection. While the UE 115 is performing the random access procedure, the UE 115 may be in a high power state to transmit random access messages and monitor for random access messages. Once the UE 115 has the RRC connection established, the UE 115 may be able to power down some device components to reduce battery usage.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
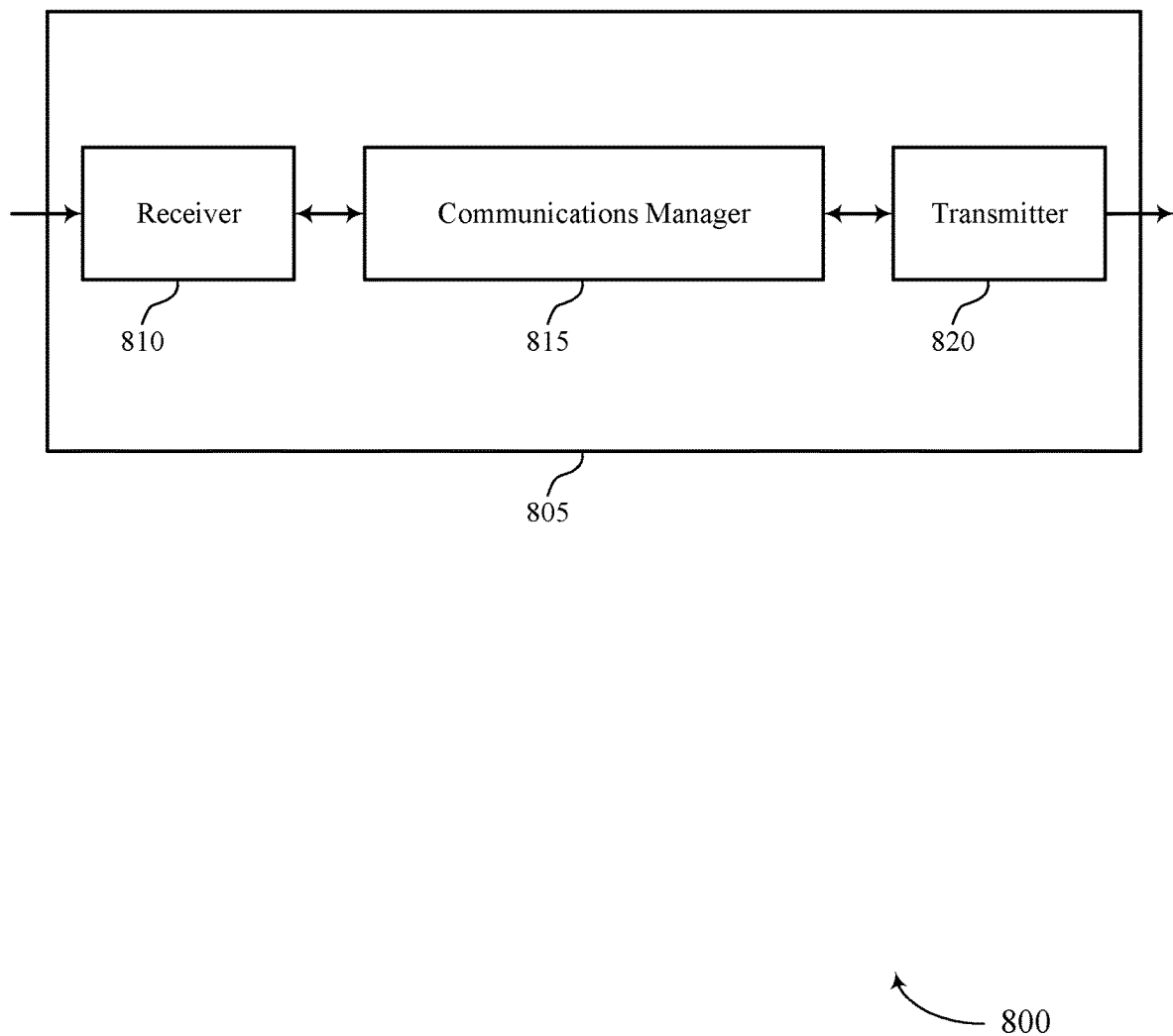
FIGS. 8 and 9 show block diagrams of devices that support compact DCI for a two-step random access channel procedure in accordance with aspects of the present disclosure.

FIG. 8 shows a block diagram 800 of a device 805 that supports compact DCI for a two-step random access channel procedure in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to compact DCI for a two-step random access channel procedure, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a UE, a first message of a two-step random access procedure, where an attribute or a content of the first message indicates a request for a second type of control signaling that includes fewer bits than a first type of control signaling, transmit a second message of the two-step random access procedure including the second type of control signaling based on the first message, where the second type of control signaling schedules the UE with resources for a downlink shared channel, and communicate with the UE on the resources that are scheduled by the second message on the downlink shared channel.

In some cases, the communications manager 815 may receive, from a UE, a first message of a four-step random access procedure, where an attribute of the first message indicates a request for a second type of control signaling that includes fewer bits than a first type of control signaling, transmit a second message of the four-step random access procedure including the second type of control signaling based on the first message, where the second type of control signaling schedules the UE with resources for a downlink shared channel, and communicate with the UE on resources that are scheduled by the second message on the downlink shared channel. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
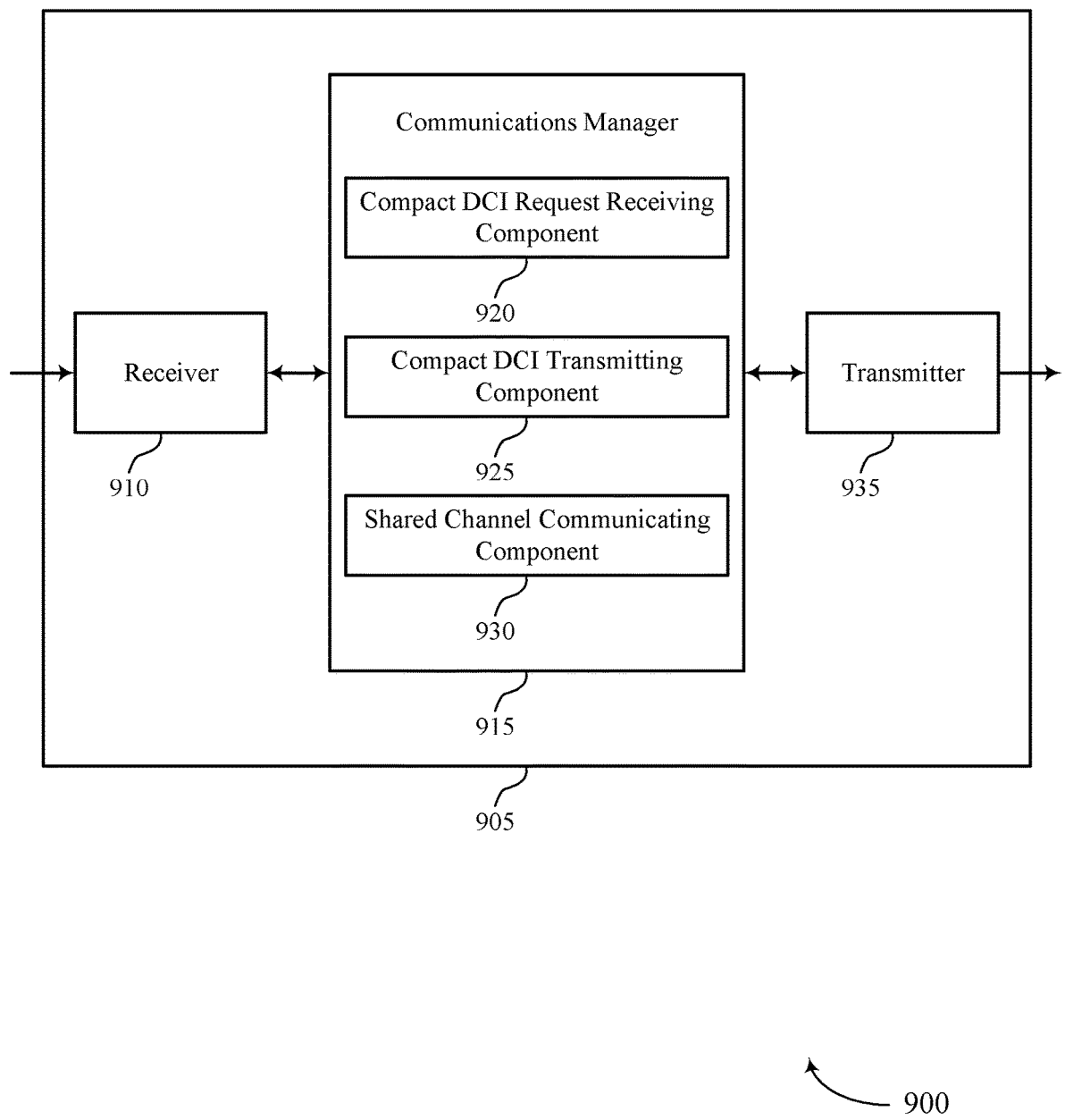

FIG. 9 shows a block diagram 900 of a device 905 that supports compact DCI for a two-step random access channel procedure in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to compact DCI for a two-step random access channel procedure, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a compact DCI request receiving component 920, a compact DCI transmitting component 925, and a shared channel communicating component 930. The communications manager 915 may be an example of aspects of the communications manager 1110 described herein.

The compact DCI request receiving component 920 may receive, from a UE, a first message of a two-step random access procedure, where an attribute or a content of the first message indicates a request for a second type of control signaling that includes fewer bits than a first type of control signaling. The compact DCI transmitting component 925 may transmit a second message of the two-step random access procedure including the second type of control signaling based on the first message, where the second type of control signaling schedules the UE with resources for a downlink shared channel. The shared channel communicating component 930 may communicate with the UE on the resources that are scheduled by the second message on the downlink shared channel.

In some cases, the compact DCI request receiving component 920 may receive, from a UE, a first message of a four-step random access procedure, where an attribute of the first message indicates a request for a second type of control signaling that includes fewer bits than a first type of control signaling. The compact DCI transmitting component 925 may transmit a second message of the four-step random access procedure including the second type of control signaling based on the first message, where the second type of control signaling schedules the UE with resources for a downlink shared channel. The shared channel communicating component 930 may communicate with the UE on resources that are scheduled by the second message on the downlink shared channel.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
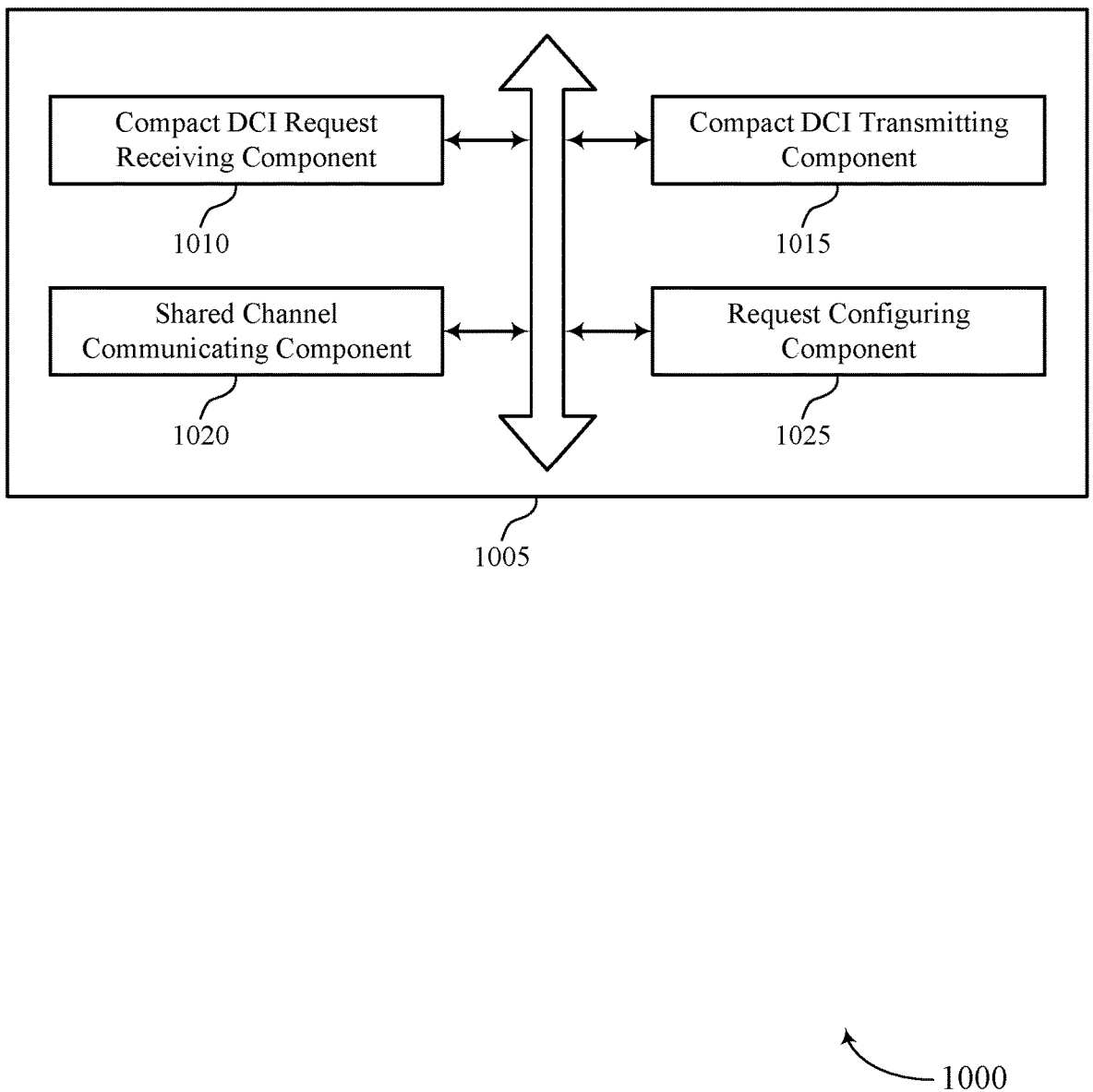
FIG. 10 shows a block diagram of a communications manager that supports compact DCI for a two-step random access channel procedure in accordance with aspects of the present disclosure.

FIG. 10 shows a block diagram 1000 of a communications manager 1005 that supports compact DCI for a two-step random access channel procedure in accordance with aspects of the present disclosure. The communications manager 1005 may be an example of aspects of a communications manager 815, a communications manager 915, or a communications manager 1110 described herein. The communications manager 1005 may include a compact DCI request receiving component 1010, a compact DCI transmitting component 1015, a shared channel communicating component 1020, and a request configuring component 1025. Each of these modules may communicate, directly or indirectly, with one another (e.g., via one or more buses).

The compact DCI request receiving component 1010 may receive, from a UE, a first message of a two-step random access procedure, where an attribute or a content of the first message indicates a request for a second type of control signaling that includes fewer bits than a first type of control signaling. In some cases, the content of the first message includes an explicit request for the second type of control signaling.

The compact DCI transmitting component 1015 may transmit a second message of the two-step random access procedure including the second type of control signaling based on the first message, where the second type of control signaling schedules the UE with resources for a downlink shared channel. In some cases, the second type of control signaling includes DCI having fewer information bits, fewer cyclic redundancy check bits, or both, than the first type of control signaling. The shared channel communicating component 1020 may communicate with the UE on the resources that are scheduled by the second message on the downlink shared channel.

The request configuring component 1025 may transmit configuration information to the UE indicating a set of conditions for transmitting the first message with the attribute or the content to request the second type of control signaling. In some cases, the set of conditions includes an indication to improve coverage of the second message, a threshold for a reference signal received power from the base station, a maximum power exposure threshold, or a combination thereof. In some cases, the configuration information includes a set of attributes including a type of first message, a set of random access preamble sequences, a set of time resources, a set of random access occasions, or a combination thereof, where the attribute indicating the request for the second type of control signaling includes one or more attributes from the set of attributes. In some cases, the configuration information is transmitted in a system information block including remaining minimum system information or other system information. In some cases, the configuration information includes an identifier for a group of UEs including the UE or a UE-specific identifier for the UE.

The compact DCI request receiving component 1010 may receive, from a UE, a first message of a four-step random access procedure, where an attribute of the first message indicates a request for a second type of control signaling that includes fewer bits than a first type of control signaling. In some cases, the second type of control signaling includes DCI having fewer information bits, fewer cyclic redundancy check bits, or both, than the first type of control signaling.

The compact DCI transmitting component 1015 may transmit a second message of the four-step random access procedure including the second type of control signaling based on the first message, where the second type of control signaling schedules the UE with resources for a downlink shared channel. The shared channel communicating component 1020 may communicate with the UE on resources that are scheduled by the second message on the downlink shared channel.

The request configuring component 1025 may transmit configuration information to the UE indicating a set of conditions for transmitting the first message with the attribute indicating the request for the second type of control signaling. In some cases, the set of conditions includes an indication to improve coverage of the second message, a threshold for a reference signal received power from the base station, a maximum power exposure threshold, or a combination thereof. In some cases, the configuration information includes a set of attributes including a type of first message, a set of random access preamble sequences, a set of time resources, a set of random access occasions, or a combination thereof, where the attribute indicating the request for the second type of control signaling includes one or more attributes from the set of attributes. In some cases, the configuration information is transmitted in a system information block including remaining minimum system information or other system information. In some cases, the configuration information includes an identifier for a group of UEs including the UE or a UE-specific identifier for the UE.

Figure 11:
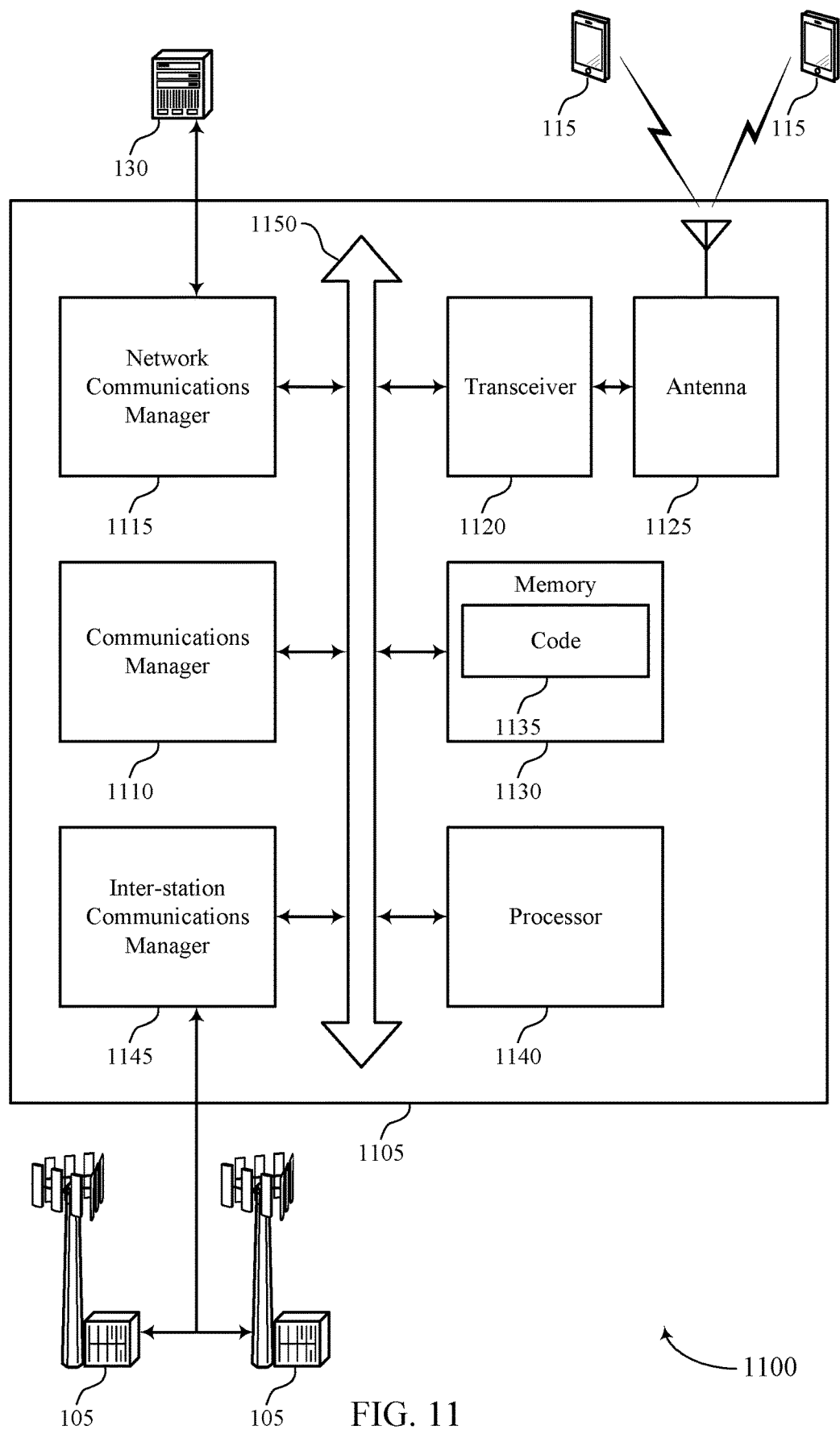
FIG. 11 shows a diagram of a system including a device that supports compact DCI for a two-step random access channel procedure in accordance with aspects of the present disclosure.

FIG. 11 shows a diagram of a system 1100 including a device 1105 that supports compact DCI for a two-step random access channel procedure in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive, from a UE, a first message of a two-step random access procedure, where an attribute or a content of the first message indicates a request for a second type of control signaling that includes fewer bits than a first type of control signaling, transmit a second message of the two-step random access procedure including the second type of control signaling based on the first message, where the second type of control signaling schedules the UE with resources for a downlink shared channel, and communicate with the UE on the resources that are scheduled by the second message on the downlink shared channel.

In some cases, the communications manager 1110 may receive, from a UE, a first message of a four-step random access procedure, where an attribute of the first message indicates a request for a second type of control signaling that includes fewer bits than a first type of control signaling, transmit a second message of the four-step random access procedure including the second type of control signaling based on the first message, where the second type of control signaling schedules the UE with resources for a downlink shared channel, and communicate with the UE on resources that are scheduled by the second message on the downlink shared channel.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting compact DCI for a two-step random access channel procedure).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
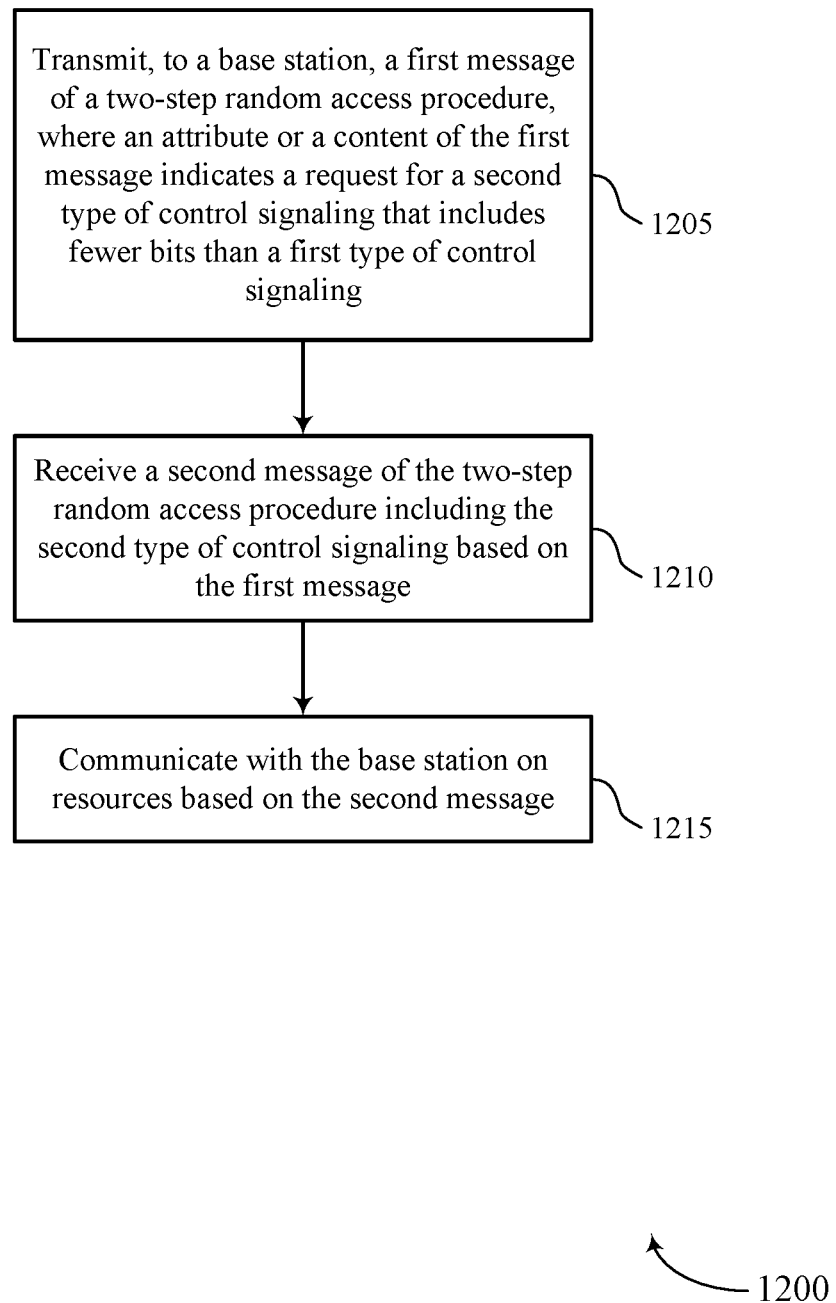
FIGS. 12 through 19 show flowcharts illustrating methods that support compact DCI for a two-step random access channel procedure in accordance with aspects of the present disclosure.

FIG. 12 shows a flowchart illustrating a method 1200 that supports compact DCI for a two-step random access channel procedure in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may transmit, to a base station, a first message of a two-step random access procedure, where an attribute or a content of the first message indicates a request for a second type of control signaling that includes fewer bits than a first type of control signaling. The operations of 1205 may be performed according to the methods described herein. In some examples, aspects of the operations of 1205 may be performed by a compact DCI requesting component as described with reference to FIGS. 4 through 7.

At 1210, the UE may receive a second message of the two-step random access procedure including the second type of control signaling based on the first message. The operations of 1210 may be performed according to the methods described herein. In some examples, aspects of the operations of 1210 may be performed by a compact DCI receiving component as described with reference to FIGS. 4 through 7.

At 1215, the UE may communicate with the base station on resources based on the second message. The operations of 1215 may be performed according to the methods described herein. In some examples, aspects of the operations of 1215 may be performed by a shared channel communicating component as described with reference to FIGS. 4 through 7.

Figure 13:
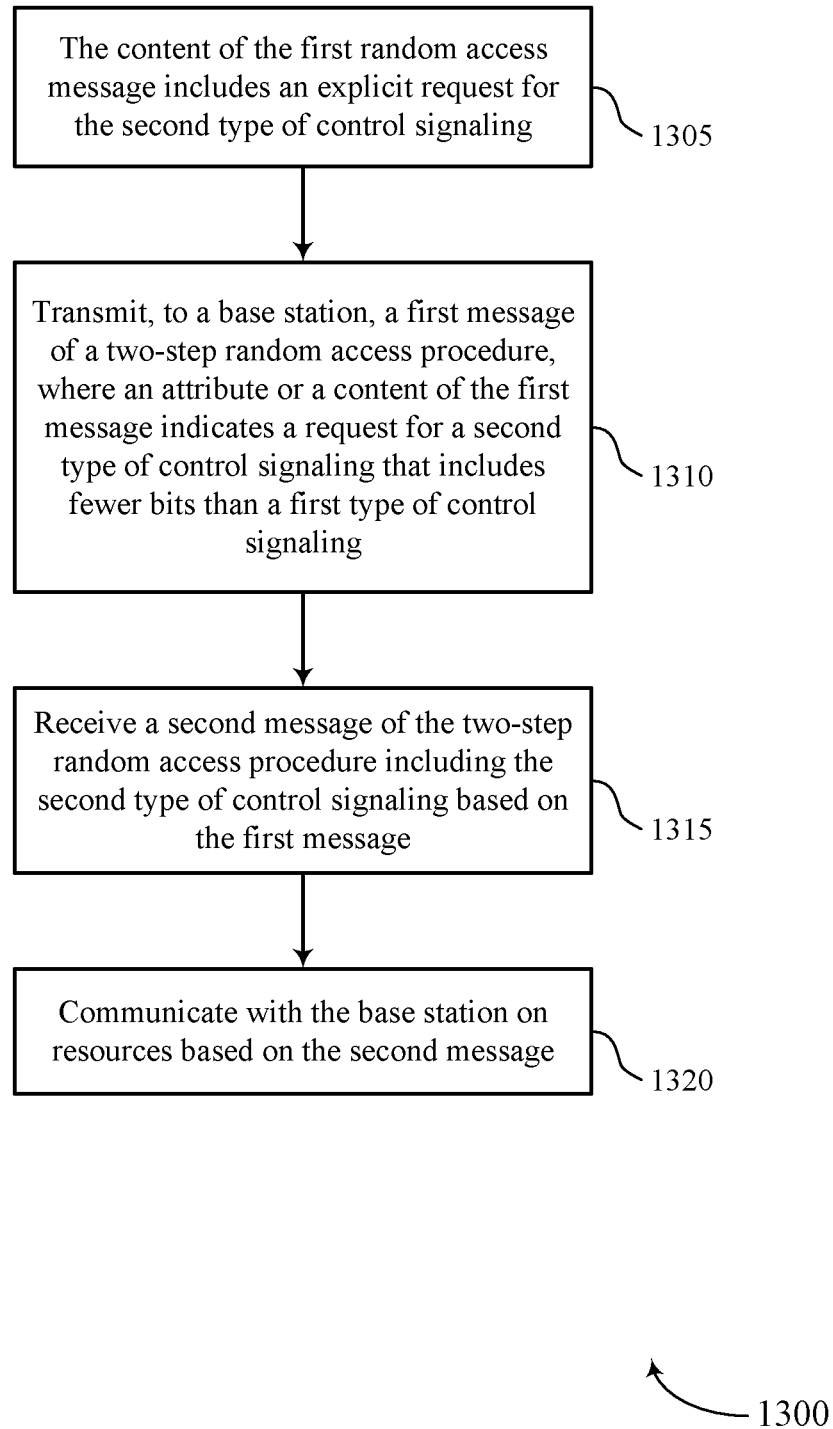

FIG. 13 shows a flowchart illustrating a method 1300 that supports compact DCI for a two-step random access channel procedure in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may the content of the first random access message includes an explicit request for the second type of control signaling. The operations of 1305 may be performed according to the methods described herein. In some examples, aspects of the operations of 1305 may be performed by a compact DCI requesting component as described with reference to FIGS. 4 through 7.

At 1310, the UE may transmit, to a base station, a first message of a two-step random access procedure, where an attribute or a content of the first message indicates a request for a second type of control signaling that includes fewer bits than a first type of control signaling. The operations of 1310 may be performed according to the methods described herein. In some examples, aspects of the operations of 1310 may be performed by a compact DCI requesting component as described with reference to FIGS. 4 through 7.

At 1315, the UE may receive a second message of the two-step random access procedure including the second type of control signaling based on the first message. The operations of 1315 may be performed according to the methods described herein. In some examples, aspects of the operations of 1315 may be performed by a compact DCI receiving component as described with reference to FIGS. 4 through 7.

At 1320, the UE may communicate with the base station on resources based on the second message. The operations of 1320 may be performed according to the methods described herein. In some examples, aspects of the operations of 1320 may be performed by a shared channel communicating component as described with reference to FIGS. 4 through 7.

Figure 14:
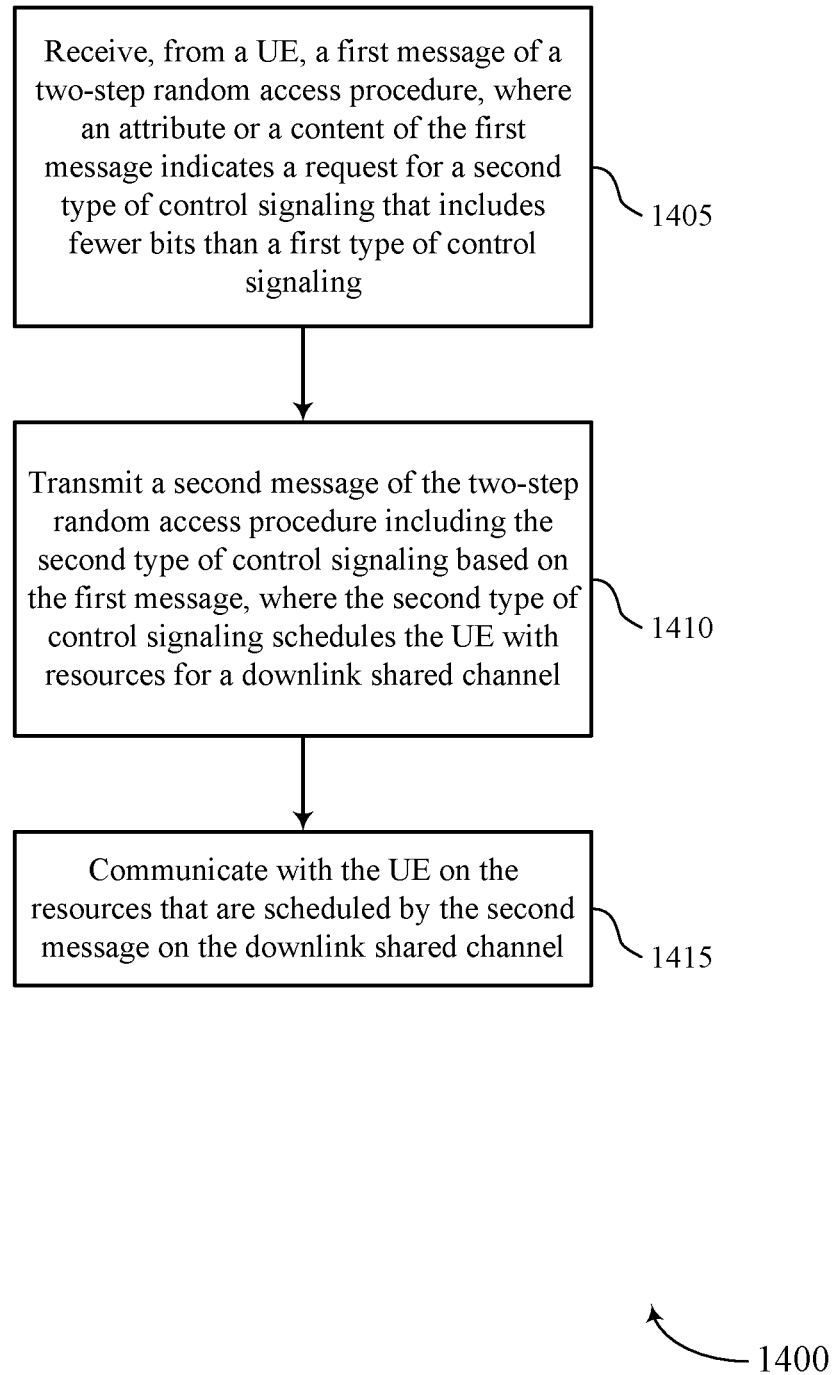

FIG. 14 shows a flowchart illustrating a method 1400 that supports compact DCI for a two-step random access channel procedure in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may receive, from a UE, a first message of a two-step random access procedure, where an attribute or a content of the first message indicates a request for a second type of control signaling that includes fewer bits than a first type of control signaling. The operations of 1405 may be performed according to the methods described herein. In some examples, aspects of the operations of 1405 may be performed by a compact DCI request receiving component as described with reference to FIGS. 8 through 11.

At 1410, the base station may transmit a second message of the two-step random access procedure including the second type of control signaling based on the first message, where the second type of control signaling schedules the UE with resources for a downlink shared channel. The operations of 1410 may be performed according to the methods described herein. In some examples, aspects of the operations of 1410 may be performed by a compact DCI transmitting component as described with reference to FIGS. 8 through 11.

At 1415, the base station may communicate with the UE on the resources that are scheduled by the second message on the downlink shared channel. The operations of 1415 may be performed according to the methods described herein. In some examples, aspects of the operations of 1415 may be performed by a shared channel communicating component as described with reference to FIGS. 8 through 11.

Figure 15:
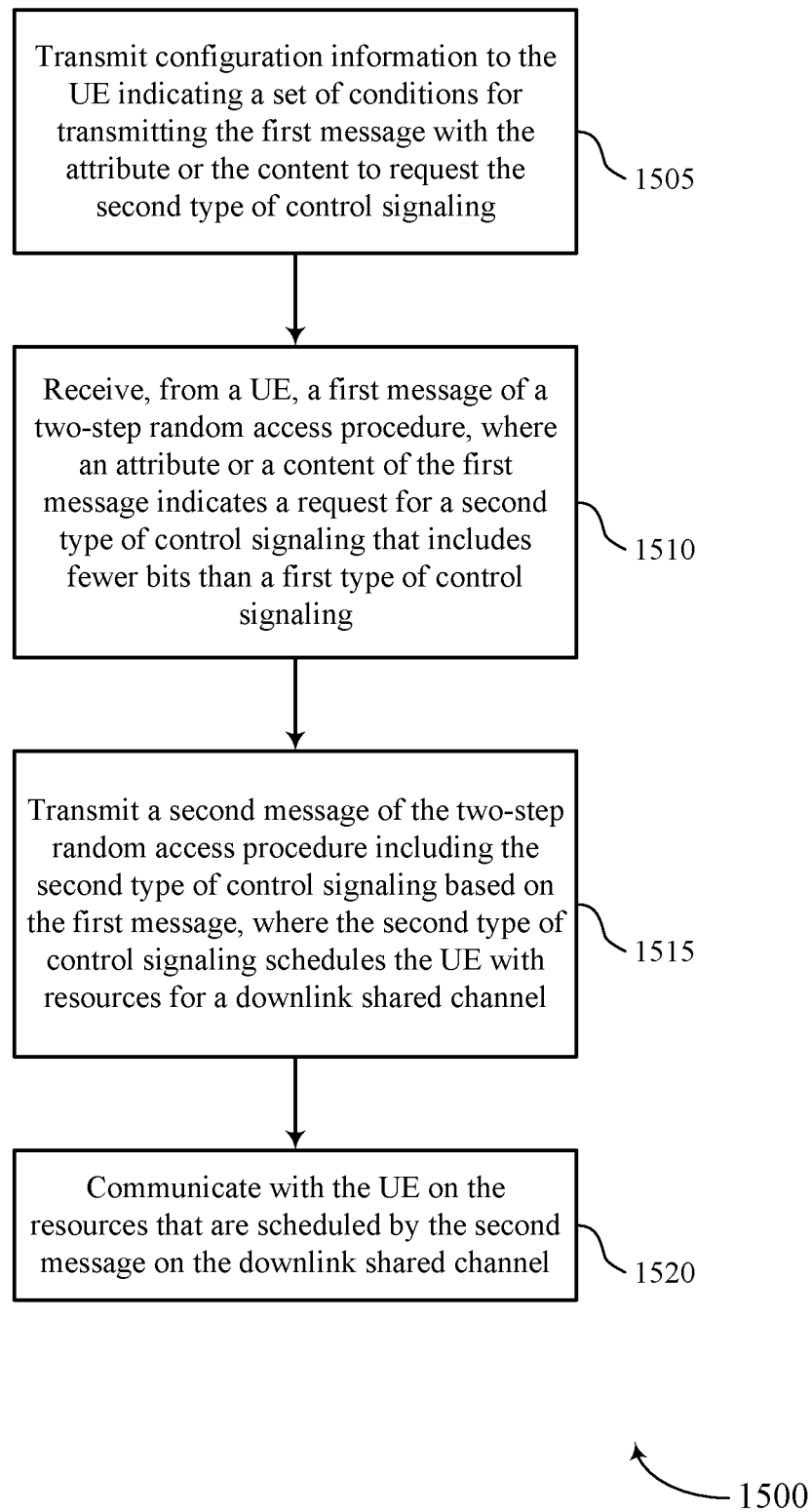

FIG. 15 shows a flowchart illustrating a method 1500 that supports compact DCI for a two-step random access channel procedure in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may transmit configuration information to the UE indicating a set of conditions for transmitting the first message with the attribute or the content to request the second type of control signaling. The operations of 1505 may be performed according to the methods described herein. In some examples, aspects of the operations of 1505 may be performed by a request configuring component as described with reference to FIGS. 8 through 11.

At 1510, the base station may receive, from a UE, a first message of a two-step random access procedure, where an attribute or a content of the first message indicates a request for a second type of control signaling that includes fewer bits than a first type of control signaling. The operations of 1510 may be performed according to the methods described herein. In some examples, aspects of the operations of 1510 may be performed by a compact DCI request receiving component as described with reference to FIGS. 8 through 11.

At 1515, the base station may transmit a second message of the two-step random access procedure including the second type of control signaling based on the first message, where the second type of control signaling schedules the UE with resources for a downlink shared channel. The operations of 1515 may be performed according to the methods described herein. In some examples, aspects of the operations of 1515 may be performed by a compact DCI transmitting component as described with reference to FIGS. 8 through 11.

At 1520, the base station may communicate with the UE on the resources that are scheduled by the second message on the downlink shared channel. The operations of 1520 may be performed according to the methods described herein. In some examples, aspects of the operations of 1520 may be performed by a shared channel communicating component as described with reference to FIGS. 8 through 11.

Figure 16:
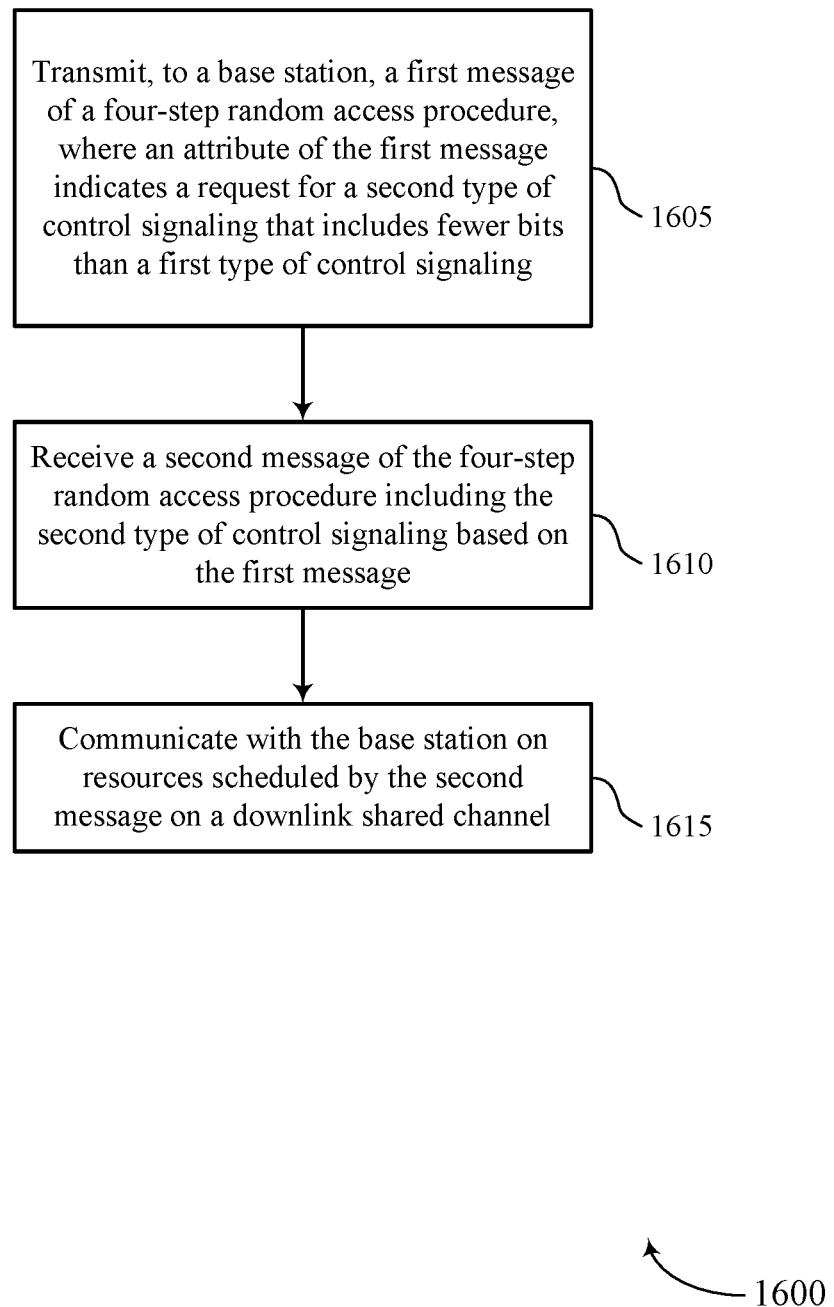

FIG. 16 shows a flowchart illustrating a method 1600 that supports compact DCI for a four-step random access procedure in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1605, the UE may transmit, to a base station, a first message of a four-step random access procedure, where an attribute of the first message indicates a request for a second type of control signaling that includes fewer bits than a first type of control signaling. The operations of 1605 may be performed according to the methods described herein. In some examples, aspects of the operations of 1605 may be performed by a compact DCI requesting component as described with reference to FIGS. 4 through 7.

At 1610, the UE may receive a second message of the four-step random access procedure including the second type of control signaling based on the first message. The operations of 1610 may be performed according to the methods described herein. In some examples, aspects of the operations of 1610 may be performed by a compact DCI receiving component as described with reference to FIGS. 4 through 7.

At 1615, the UE may communicate with the base station on resources scheduled by the second message on a downlink shared channel. The operations of 1615 may be performed according to the methods described herein. In some examples, aspects of the operations of 1615 may be performed by a shared channel communicating component as described with reference to FIGS. 4 through 7.

Figure 17:
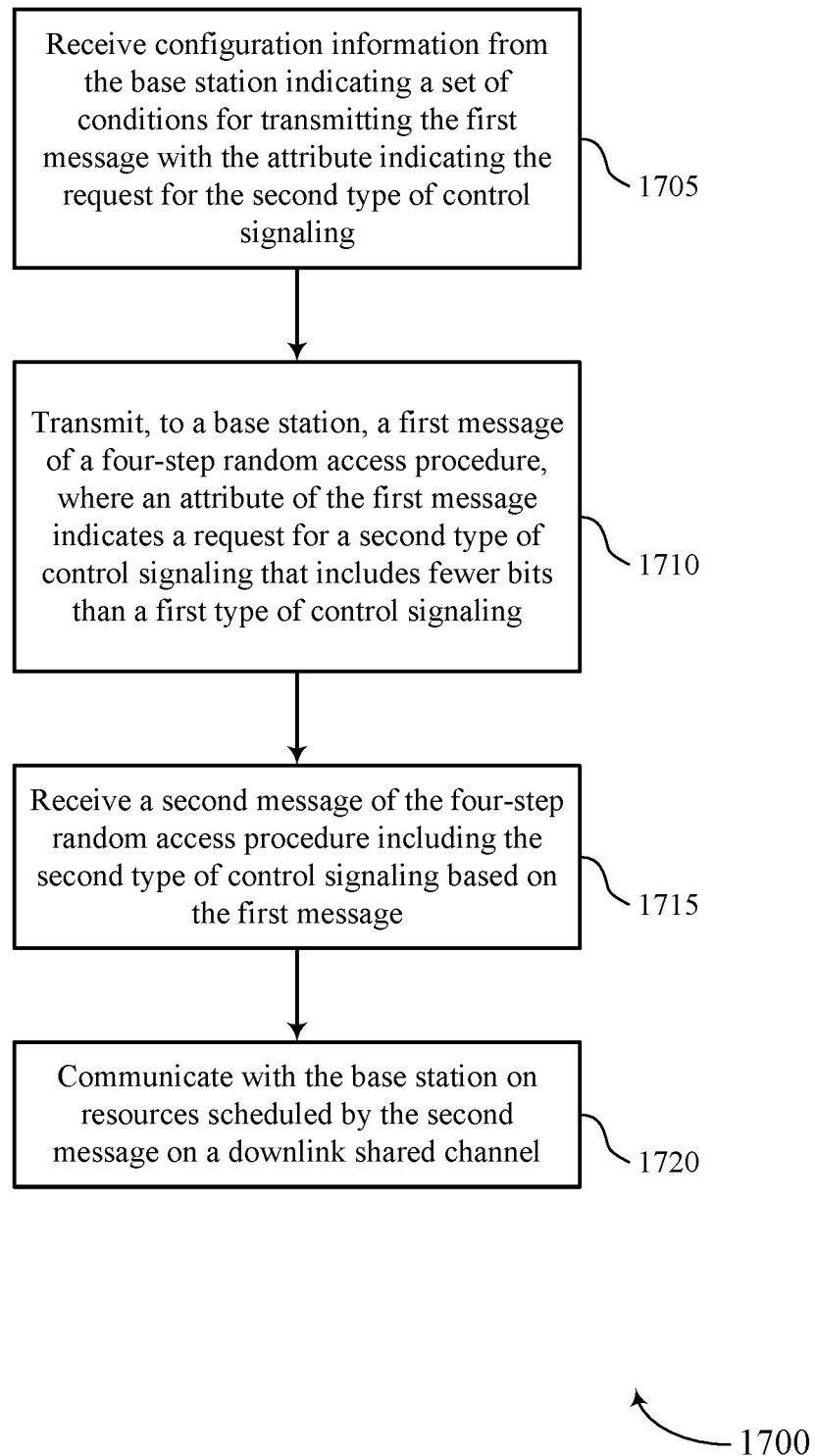

FIG. 17 shows a flowchart illustrating a method 1700 that supports compact DCI for a four-step random access procedure in accordance with aspects of the present disclosure. The operations of method 1700 may be implemented by a UE 115 or its components as described herein. For example, the operations of method 1700 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1705, the UE may receive configuration information from the base station indicating a set of conditions for transmitting the first message with the attribute indicating the request for the second type of control signaling. The operations of 1705 may be performed according to the methods described herein. In some examples, aspects of the operations of 1705 may be performed by a request configuration component as described with reference to FIGS. 4 through 7.

At 1710, the UE may transmit, to a base station, a first message of a four-step random access procedure, where an attribute of the first message indicates a request for a second type of control signaling that includes fewer bits than a first type of control signaling. The operations of 1710 may be performed according to the methods described herein. In some examples, aspects of the operations of 1710 may be performed by a compact DCI requesting component as described with reference to FIGS. 4 through 7.

At 1715, the UE may receive a second message of the four-step random access procedure including the second type of control signaling based on the first message. The operations of 1715 may be performed according to the methods described herein. In some examples, aspects of the operations of 1715 may be performed by a compact DCI receiving component as described with reference to FIGS. 4 through 7.

At 1720, the UE may communicate with the base station on resources scheduled by the second message on a downlink shared channel. The operations of 1720 may be performed according to the methods described herein. In some examples, aspects of the operations of 1720 may be performed by a shared channel communicating component as described with reference to FIGS. 4 through 7.

Figure 18:
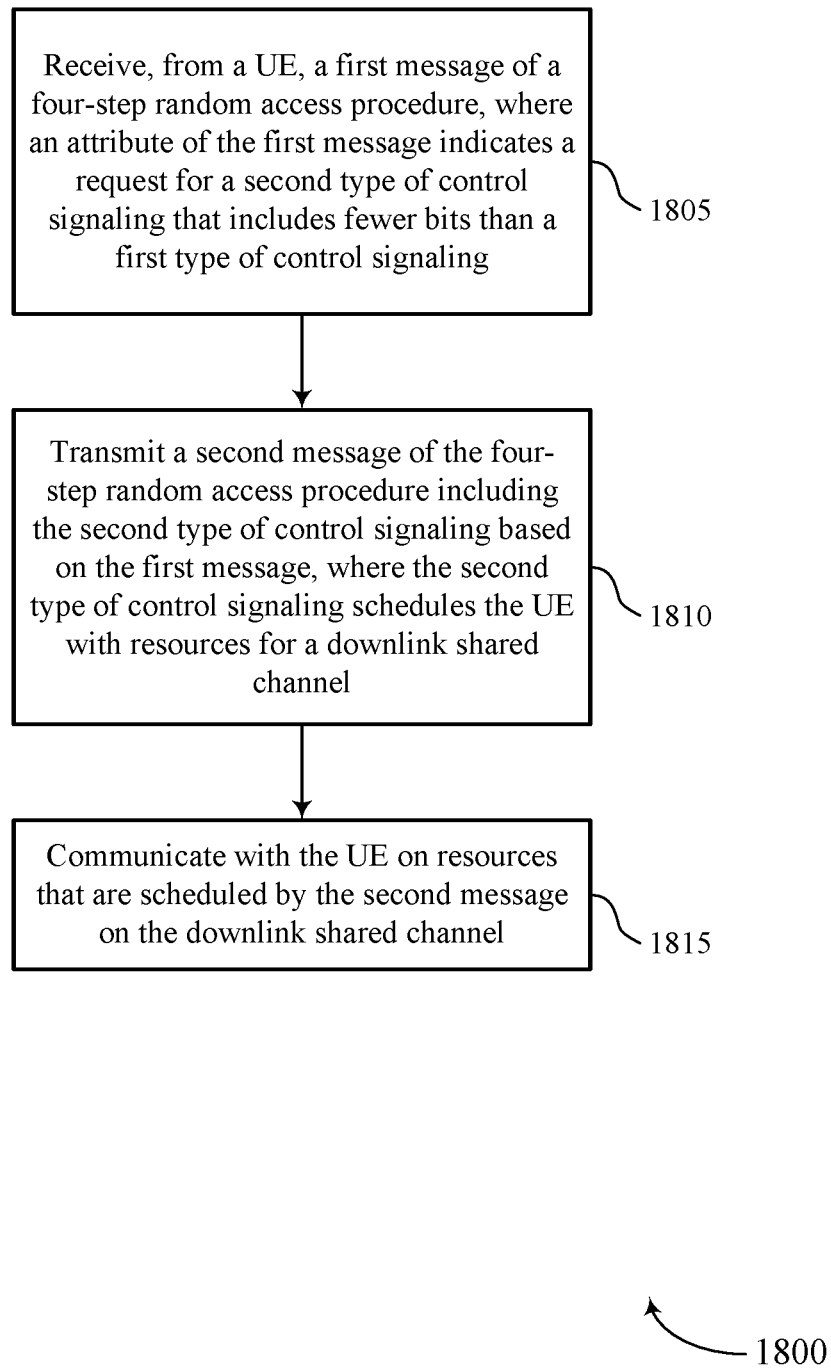

FIG. 18 shows a flowchart illustrating a method 1800 that supports compact DCI for a four-step random access procedure in accordance with aspects of the present disclosure. The operations of method 1800 may be implemented by a base station 105 or its components as described herein. For example, the operations of method 1800 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE, a first message of a four-step random access procedure, where an attribute of the first message indicates a request for a second type of control signaling that includes fewer bits than a first type of control signaling. The operations of 1805 may be performed according to the methods described herein. In some examples, aspects of the operations of 1805 may be performed by a compact DCI request receiving component as described with reference to FIGS. 8 through 11.

At 1810, the base station may transmit a second message of the four-step random access procedure including the second type of control signaling based on the first message, where the second type of control signaling schedules the UE with resources for a downlink shared channel. The operations of 1810 may be performed according to the methods described herein. In some examples, aspects of the operations of 1810 may be performed by a compact DCI transmitting component as described with reference to FIGS. 8 through 11.

At 1815, the base station may communicate with the UE on resources that are scheduled by the second message on the downlink shared channel. The operations of 1815 may be performed according to the methods described herein. In some examples, aspects of the operations of 1815 may be performed by a shared channel communicating component as described with reference to FIGS. 8 through 11.

Figure 19:
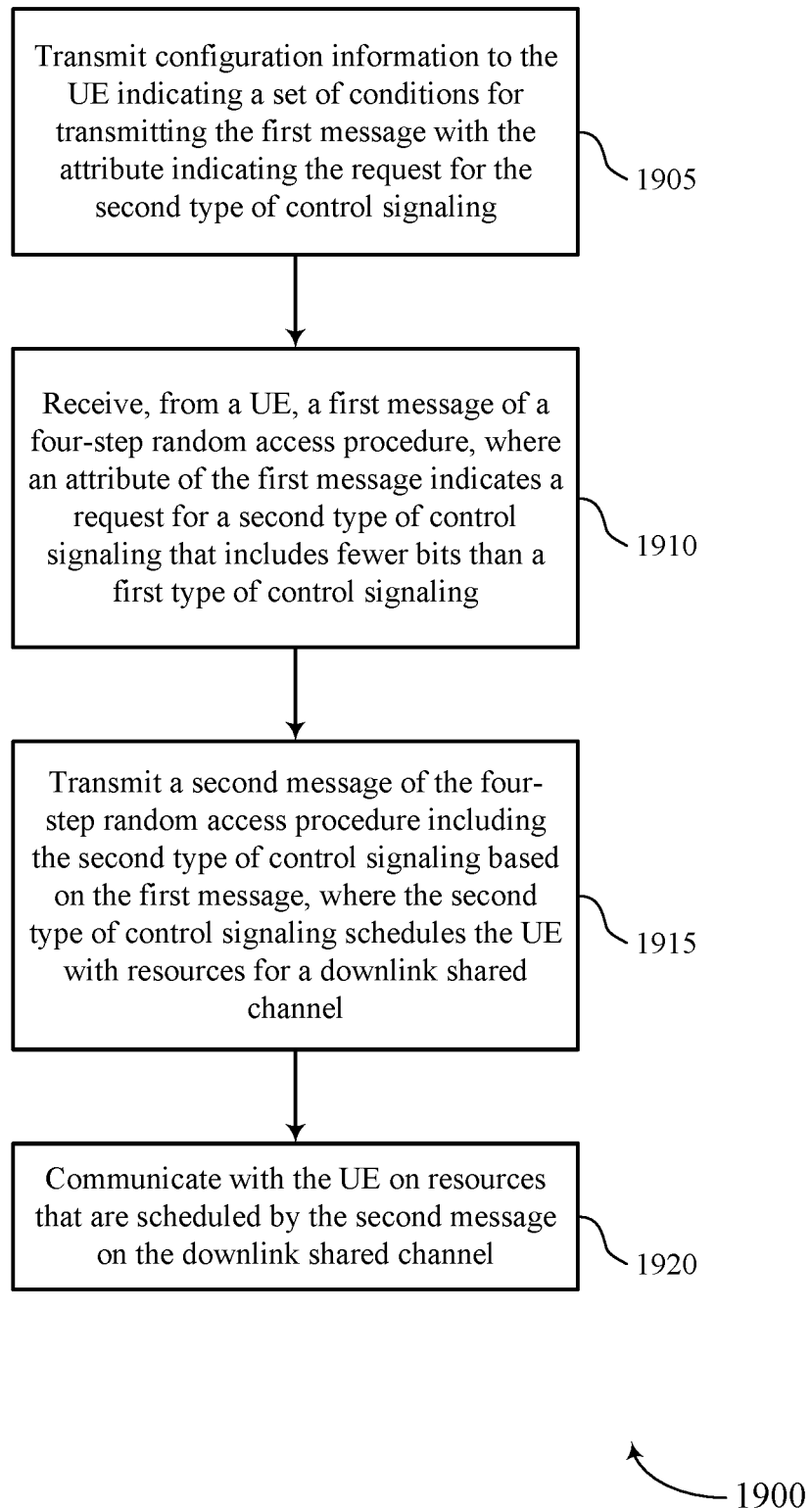

FIG. 19 shows a flowchart illustrating a method 1900 that supports compact DCI for a four-step random access procedure in accordance with aspects of the present disclosure. The operations of method 1900 may be implemented by a base station 105 or its components as described herein. For example, the operations of method 1900 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1905, the base station may transmit configuration information to the UE indicating a set of conditions for transmitting the first message with the attribute indicating the request for the second type of control signaling. The operations of 1905 may be performed according to the methods described herein. In some examples, aspects of the operations of 1905 may be performed by a request configuration component as described with reference to FIGS. 8 through 11.

At 1910, the base station may receive, from a UE, a first message of a four-step random access procedure, where an attribute of the first message indicates a request for a second type of control signaling that includes fewer bits than a first type of control signaling. The operations of 1910 may be performed according to the methods described herein. In some examples, aspects of the operations of 1910 may be performed by a compact DCI request receiving component as described with reference to FIGS. 8 through 11.

At 1915, the base station may transmit a second message of the four-step random access procedure including the second type of control signaling based on the first message, where the second type of control signaling schedules the UE with resources for a downlink shared channel. The operations of 1915 may be performed according to the methods described herein. In some examples, aspects of the operations of 1915 may be performed by a compact DCI transmitting component as described with reference to FIGS. 8 through 11.

At 1920, the base station may communicate with the UE on resources that are scheduled by the second message on the downlink shared channel. The operations of 1920 may be performed according to the methods described herein. In some examples, aspects of the operations of 1920 may be performed by a shared channel communicating component as described with reference to FIGS. 8 through 11.

The following provides an overview of aspects of the present disclosure:

Aspect 1: A method for wireless communications at a UE, comprising: transmitting, to a base station, a first message of a two-step random access procedure, wherein an attribute or a content of the first message indicates a request for a second type of control signaling that comprises fewer bits than a first type of control signaling; receiving a second message of the two-step random access procedure comprising the second type of control signaling based at least in part on the first message; and communicating with the base station on resources based at least in part on the second message.

Aspect 2: The method of aspect 1, wherein the content of the first random access message comprises an explicit request for the second type of control signaling.

Aspect 3: The method of any of aspects 1 through 2, further comprising: receiving configuration information from the base station indicating a set of conditions for transmitting the first message with the attribute or the content to request the second type of control signaling.

Aspect 4: The method of aspect 3, wherein the set of conditions comprises an indication to improve coverage of the second message, a threshold for a reference signal received power from the base station, a maximum power exposure threshold, or a combination thereof.

Aspect 5: The method of any of aspects 3 through 4, wherein the configuration information comprises a set of attributes including a type of first message, a set of random access preamble sequences, a set of time resources, a set of random access occasions, or a combination thereof, the attribute indicating the request for the second type of control signaling comprises one or more attributes from the set of attributes.

Aspect 6: The method of any of aspects 3 through 5, wherein the configuration information is received in a system information block comprising remaining minimum system information or other system information.

Aspect 7: The method of any of aspects 3 through 6, further comprising: determining to transmit the first message of the two-step random access procedure with the attribute or the content indicating the request for the second type of control signaling based at least in part on satisfying one or more conditions of the set of conditions.

Aspect 8: The method of any of aspects 3 through 7, wherein the configuration information comprises an identifier for a group of UEs including the UE or a UE-specific identifier for the UE.

Aspect 9: The method of any of aspects 1 through 8, wherein the second type of control signaling comprises DCI having fewer information bits, fewer cyclic redundancy check bits, or both, than the first type of control signaling.

Aspect 10: A method for wireless communications at a base station, comprising: receiving, from a UE, a first message of a two-step random access procedure, wherein an attribute or a content of the first message indicates a request for a second type of control signaling that comprises fewer bits than a first type of control signaling; transmitting a second message of the two-step random access procedure comprising the second type of control signaling based at least in part on the first message, wherein the second type of control signaling schedules the UE with resources for a downlink shared channel; and communicating with the UE on the resources that are scheduled by the second message on the downlink shared channel.

Aspect 11: The method of aspect 10, wherein the content of the first message comprises an explicit request for the second type of control signaling.

Aspect 12: The method of any of aspects 10 through 11, further comprising: transmitting configuration information to the UE indicating a set of conditions for transmitting the first message with the attribute or the content to request the second type of control signaling.

Aspect 13: The method of aspect 12, wherein the set of conditions comprises an indication to improve coverage of the second message, a threshold for a reference signal received power from the base station, a maximum power exposure threshold, or a combination thereof.

Aspect 14: The method of any of aspects 12 through 13, wherein the configuration information comprises a set of attributes including a type of first message, a set of random access preamble sequences, a set of time resources, a set of random access occasions, or a combination thereof, the attribute indicating the request for the second type of control signaling comprises one or more attributes from the set of attributes.

Aspect 15: The method of any of aspects 12 through 14, wherein the configuration information is transmitted in a system information block comprising remaining minimum system information or other system information.

Aspect 16: The method of any of aspects 12 through 15, wherein the configuration information comprises an identifier for a group of UEs including the UE or a UE-specific identifier for the UE.

Aspect 17: The method of any of aspects 10 through 16, wherein the second type of control signaling comprises DCI having fewer information bits, fewer cyclic redundancy check bits, or both, than the first type of control signaling.

Aspect 18: A method for wireless communications at a UE, comprising: transmitting, to a base station, a first message of a four-step random access procedure, wherein an attribute of the first message indicates a request for a second type of control signaling that comprises fewer bits than a first type of control signaling; receiving a second message of the four-step random access procedure comprising the second type of control signaling based at least in part on the first message; and communicating with the base station on resources scheduled by the second message on a downlink shared channel.

Aspect 19: The method of aspect 18, further comprising: receiving configuration information from the base station indicating a set of conditions for transmitting the first message with the attribute indicating the request for the second type of control signaling.

Aspect 20: The method of aspect 19, wherein the set of conditions comprises an indication to improve coverage of the second message, a threshold for a reference signal received power from the base station, a maximum power exposure threshold, or a combination thereof.

Aspect 21: The method of any of aspects 19 through 20, wherein the configuration information comprises a set of attributes including a type of first message, a set of random access preamble sequences, a set of time resources, a set of random access occasions, or a combination thereof, the attribute indicating the request for the second type of control signaling comprises one or more attributes from the set of attributes.

Aspect 22: The method of any of aspects 19 through 21, wherein the configuration information is received in a system information block comprising remaining minimum system information or other system information.

Aspect 23: The method of any of aspects 19 through 22, further comprising: determining to transmit the first message of the four-step random access procedure with the attribute indicating the request for the second type of control signaling based at least in part on satisfying one or more conditions of the set of conditions.

Aspect 24: The method of any of aspects 19 through 23, wherein the configuration information comprises an identifier for a group of UEs including the UE or a UE-specific identifier for the UE.

Aspect 25: The method of any of aspects 18 through 24, wherein the second type of control signaling comprises DCI having fewer information bits, fewer cyclic redundancy check bits, or both, than the first type of control signaling.

Aspect 26: A method for wireless communications at a base station, comprising: receiving, from a UE, a first message of a four-step random access procedure, wherein an attribute of the first message indicates a request for a second type of control signaling that comprises fewer bits than a first type of control signaling; transmitting a second message of the four-step random access procedure comprising the second type of control signaling based at least in part on the first message, wherein the second type of control signaling schedules the UE with resources for a downlink shared channel; and communicating with the UE on resources that are scheduled by the second message on the downlink shared channel.

Aspect 27: The method of aspect 26, further comprising: transmitting configuration information to the UE indicating a set of conditions for transmitting the first message with the attribute indicating the request for the second type of control signaling.

Aspect 28: The method of aspect 27, wherein the set of conditions comprises an indication to improve coverage of the second message, a threshold for a reference signal received power from the base station, a maximum power exposure threshold, or a combination thereof.

Aspect 29: The method of any of aspects 27 through 28, wherein the configuration information comprises a set of attributes including a type of first message, a set of random access preamble sequences, a set of time resources, a set of random access occasions, or a combination thereof, the attribute indicating the request for the second type of control signaling comprises one or more attributes from the set of attributes.

Aspect 30: The method of any of aspects 27 through 29, wherein the configuration information is transmitted in a system information block comprising remaining minimum system information or other system information.

Aspect 31: The method of any of aspects 27 through 30, wherein the configuration information comprises an identifier for a group of UEs including the UE or a UE-specific identifier for the UE.

Aspect 32: The method of any of aspects 26 through 31, wherein the second type of control signaling comprises DCI having fewer information bits, fewer cyclic redundancy check bits, or both, than the first type of control signaling.

Aspect 33: An apparatus for wireless communications at a UE, comprising a processor; memory coupled with the processor; and instructions stored in the memory and executable by the processor to cause the apparatus to perform a method of any of aspects 1 through 9.

Aspect 34: An apparatus for wireless communications at a UE, comprising at least one means for performing a method of any of aspects 1 through 9.

Aspect 35: A non-transitory computer-readable medium storing code for wireless communications at a UE, the code comprising instructions executable by a processor to perform a method of any of aspects 1 through 9.

Aspect 36: An apparatus for wireless communications at a base station, comprising a processor; memory coupled with the processor; and instructions stored in the memory and executable by the processor to cause the apparatus to perform a method of any of aspects 10 through 17.

Aspect 37: An apparatus for wireless communications at a base station, comprising at least one means for performing a method of any of aspects 10 through 17.

Aspect 38: A non-transitory computer-readable medium storing code for wireless communications at a base station, the code comprising instructions executable by a processor to perform a method of any of aspects 10 through 17.

Aspect 39: An apparatus for wireless communications at a UE, comprising a processor; memory coupled with the processor; and instructions stored in the memory and executable by the processor to cause the apparatus to perform a method of any of aspects 18 through 25.

Aspect 40: An apparatus for wireless communications at a UE, comprising at least one means for performing a method of any of aspects 18 through 25.

Aspect 41: A non-transitory computer-readable medium storing code for wireless communications at a UE, the code comprising instructions executable by a processor to perform a method of any of aspects 18 through 25.

Aspect 42: An apparatus for wireless communications at a base station, comprising a processor; memory coupled with the processor; and instructions stored in the memory and executable by the processor to cause the apparatus to perform a method of any of aspects 26 through 32.

Aspect 43: An apparatus for wireless communications at a base station, comprising at least one means for performing a method of any of aspects 26 through 32.

Aspect 44: A non-transitory computer-readable medium storing code for wireless communications at a base station, the code comprising instructions executable by a processor to perform a method of any of aspects 26 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
    a processor;
    memory coupled with the processor; and
    instructions stored in the memory and executable by the processor to cause the apparatus to:
        transmit, to a network entity, a first message of a two-step random access procedure, wherein an attribute or a content of the first message indicates a request for a second type of control signaling that comprises fewer bits than a first type of control signaling;
        receive a second message of the two-step random access procedure comprising the second type of control signaling based at least in part on the first message; and
        communicate with the network entity on resources based at least in part on the second message.

2. The apparatus of claim 1, wherein the content of the first message comprises an explicit request for the second type of control signaling.

3. The apparatus of claim 1, wherein the instructions are further executable by the processor to cause the apparatus to:
    receive configuration information from the network entity indicating a set of conditions for transmitting the first message with the attribute or the content to request the second type of control signaling.

4. The apparatus of claim 3, wherein the set of conditions comprises an indication to improve coverage of the second message, a threshold for a reference signal received power from the network entity, a maximum power exposure threshold, or a combination thereof.

5. The apparatus of claim 3, wherein:
the configuration information comprises a set of attributes including a type of first message, a set of random access preamble sequences, a set of time resources, a set of random access occasions, or a combination thereof,
the attribute indicating the request for the second type of control signaling comprises one or more attributes from the set of attributes.

6. The apparatus of claim 3, wherein the configuration information is received in a system information block comprising remaining minimum system information or other system information.

7. The apparatus of claim 3, wherein the instructions are further executable by the processor to cause the apparatus to:
determine to transmit the first message of the two-step random access procedure with the attribute or the content indicating the request for the second type of control signaling based at least in part on satisfying one or more conditions of the set of conditions.

8. The apparatus of claim 3, wherein the configuration information comprises an identifier for a group of UEs including the UE or a UE-specific identifier for the UE.

9. The apparatus of claim 1, wherein the second type of control signaling comprises downlink control information having fewer information bits, fewer cyclic redundancy check bits, or both, than the first type of control signaling.

10. An apparatus for wireless communications at a user equipment (UE), comprising:
a processor;
memory coupled with the processor; and
instructions stored in the memory and executable by the processor to cause the apparatus to:
transmit, to a network entity, a first message of a four-step random access procedure, wherein an attribute of the first message indicates a request for a second type of control signaling that comprises fewer bits than a first type of control signaling;
receive a second message of the four-step random access procedure comprising the second type of control signaling based at least in part on the first message; and
communicate with the network entity on resources scheduled by the second message on a downlink shared channel.

11. The apparatus of claim 10, wherein the instructions are further executable by the processor to cause the apparatus to:
receive configuration information from the network entity indicating a set of conditions for transmitting the first message with the attribute indicating the request for the second type of control signaling.

12. The apparatus of claim 11, wherein the set of conditions comprises an indication to improve coverage of the second message, a threshold for a reference signal received power from the network entity, a maximum power exposure threshold, or a combination thereof.

13. The apparatus of claim 11, wherein:
the configuration information comprises a set of attributes including a type of first message, a set of random access preamble sequences, a set of time resources, a set of random access occasions, or a combination thereof,
the attribute indicating the request for the second type of control signaling comprises one or more attributes from the set of attributes.

14. The apparatus of claim 11, wherein the configuration information is received in a system information block comprising remaining minimum system information or other system information.

15. The apparatus of claim 11, wherein the instructions are further executable by the processor to cause the apparatus to:
determine to transmit the first message of the four-step random access procedure with the attribute indicating the request for the second type of control signaling based at least in part on satisfying one or more conditions of the set of conditions.

16. The apparatus of claim 11, wherein the configuration information comprises an identifier for a group of UEs including the UE or a UE-specific identifier for the UE.

17. The apparatus of claim 10, wherein the second type of control signaling comprises downlink control information having fewer information bits, fewer cyclic redundancy check bits, or both, than the first type of control signaling.

18. A method for wireless communications at a network entity, comprising:
receiving, from a user equipment (UE), a first message of a two-step random access procedure, wherein an attribute or a content of the first message indicates a request for a second type of control signaling that comprises fewer bits than a first type of control signaling;
transmitting a second message of the two-step random access procedure comprising the second type of control signaling based at least in part on the first message, wherein the second type of control signaling schedules the UE with resources for a downlink shared channel; and
communicating with the UE on the resources that are scheduled by the second message on the downlink shared channel.

19. The method of claim 18, wherein the content of the first message comprises an explicit request for the second type of control signaling.

20. The method of claim 18, further comprising:
transmitting configuration information to the UE indicating a set of conditions for transmitting the first message with the attribute or the content to request the second type of control signaling.

21. The method of claim 20, wherein the set of conditions comprises an indication to improve coverage of the second message, a threshold for a reference signal received power from the network entity, a maximum power exposure threshold, or a combination thereof.

22. The method of claim 20, wherein:
the configuration information comprises a set of attributes including a type of first message, a set of random access preamble sequences, a set of time resources, a set of random access occasions, or a combination thereof,
the attribute indicating the request for the second type of control signaling comprises one or more attributes from the set of attributes.

23. The method of claim 20, wherein the configuration information comprises an identifier for a group of UEs including the UE or a UE-specific identifier for the UE.

24. The method of claim 18, wherein the second type of control signaling comprises downlink control information having fewer information bits, fewer cyclic redundancy check bits, or both, than the first type of control signaling.

25. A method for wireless communications at a network entity, comprising:
receiving, from a user equipment (UE), a first message of a four-step random access procedure, wherein an attribute of the first message indicates a request for a second type of control signaling that comprises fewer bits than a first type of control signaling;
transmitting a second message of the four-step random access procedure comprising the second type of control signaling based at least in part on the first message, wherein the second type of control signaling schedules the UE with resources for a downlink shared channel; and communicating with the UE on the resources that are scheduled by the second message on the downlink shared channel.

26. The method of claim 25, further comprising:

transmitting configuration information to the UE indicating a set of conditions for transmitting the first message with the attribute indicating the request for the second type of control signaling.

27. The method of claim 26, wherein the set of conditions comprises an indication to improve coverage of the second message, a threshold for a reference signal received power from the network entity, a maximum power exposure threshold, or a combination thereof.

28. The method of claim 26, wherein:

the configuration information comprises a set of attributes including a type of first message, a set of random access preamble sequences, a set of time resources, a set of random access occasions, or a combination thereof, the attribute indicating the request for the second type of control signaling comprises one or more attributes from the set of attributes.

29. The method of claim 26, wherein the configuration information comprises an identifier for a group of UEs including the UE or a UE-specific identifier for the UE.

30. The method of claim 25, wherein the second type of control signaling comprises downlink control information having fewer information bits, fewer cyclic redundancy check bits, or both, than the first type of control signaling.

* * * * *